United States Patent
Shi et al.

(10) Patent No.: US 12,455,209 B1
(45) Date of Patent: Oct. 28, 2025

(54) GAS PERMEATION AND LEAKAGE RATE TESTING DEVICE AND METHOD FOR NON-METALLIC HYDROGEN TRANSMISSION PIPE

(71) Applicant: ZHEJIANG UNIVERSITY, Zhejiang (CN)

(72) Inventors: Jianfeng Shi, Zhejiang (CN); Zhanqi Fan, Zhejiang (CN); Riwu Yao, Zhejiang (CN); Jinyang Zheng, Zhejiang (CN); Yiming Ying, Zhejiang (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 19/215,288

(22) Filed: May 21, 2025

Related U.S. Application Data

(63) Continuation of application No. PCT/CN2025/090326, filed on Apr. 22, 2025.

(30) Foreign Application Priority Data

Apr. 30, 2024 (CN) .......................... 202410538292.8
Aug. 14, 2024 (CN) .......................... 202411110660.5

(51) Int. Cl.
  *G01M 3/28* (2006.01)
  *G01M 3/00* (2006.01)
  *G01N 15/08* (2006.01)

(52) U.S. Cl.
  CPC .......... *G01M 3/2815* (2013.01); *G01M 3/007* (2013.01)

(58) Field of Classification Search
  CPC .......... G01M 3/00; G01M 3/007; G01M 3/08; G01M 3/28; G01M 3/2815; G01N 15/00;
  (Continued)

(56) References Cited

U.S. PATENT DOCUMENTS 11,703,439 B1 7/2023 Shi et al.
2018/0372579 A1 12/2018 Decker et al.

FOREIGN PATENT DOCUMENTS

CN 103674808 A 3/2014
CN 207717304 U 8/2018
(Continued)

OTHER PUBLICATIONS

CN-113188978-A Machine Translation (Year: 2021).*
(Continued)

*Primary Examiner* — Nguyen Q. Ha

(57) ABSTRACT

A gas permeation and leakage rate testing device and method for a non-metallic hydrogen transmission pipe. The device includes: a testing member formed with a testing cavity adapted to placing a to-be-tested pipe, and the testing cavity being formed with a sealed testing chamber after the to-be-tested pipe is placed therein; a calibration chamber selectively communicated with the testing chamber; a first gas-filling assembly selectively communicated with the calibration chamber to be adapted to filling a gas into the calibration chamber to a first set pressure; a measuring unit configured to measure pressures and temperatures in the calibration chamber and the testing chamber, and to calculate a calculated volume of the testing chamber; and a permeation and leakage rate testing unit configured to obtain a pressure change value of the testing chamber in a preset time interval and calculate a gas permeation and leakage rate of the to-be-tested pipe.

20 Claims, 3 Drawing Sheets

(58) Field of Classification Search
CPC . G01N 15/08; G01N 15/0806; G01N 15/0826
See application file for complete search history.

(56) References Cited

FOREIGN PATENT DOCUMENTS

| CN | 113188978 A | * | 7/2021 | ......... G01N 15/0826 |
|----|-------------|---|--------|------------------------|
| CN | 115127750 A |   | 9/2022 |                        |
| CN | 114813452 B |   | 10/2022 |                       |

OTHER PUBLICATIONS

1st Office Action of counterpart Chinese Patent Application No. 202411110660.5 issued on Oct. 8, 2024.
Notice of Allowance of counterpart Chinese Patent Application No. 202411110660.5 issued on Oct. 31, 2024.
Guoquan Qi et al., Study on Control of Gas Permeation Behavior in Reinforced Thermoplastics Pipeline, Petroleum Tubular Goods & Instruments, Apr. 15, 2017, pp. 58-61, vol. 3, No. 2.
Yongzhi Zhao et al., Safety Technology for Pipeline Transportation of Hydrogen-Natural Gas Mixtures, Chemical Engineering & Machinery, Dec. 31, 2016, pp. 1-7, vol. 43, No. 1.
Pal-Stefan Murvay et al., A survey on gas leak detection and localization techniques, Journal of Loss Prevention in the Process Industries, Dec. 31, 2012, pp. 966-973, vol. 25.

* cited by examiner

GAS PERMEATION AND LEAKAGE RATE TESTING DEVICE AND METHOD FOR NON-METALLIC HYDROGEN TRANSMISSION PIPE

CROSS-REFERENCE TO RELATED APPLICATIONS

The present disclosure is a Continuation Application of PCT Application No. PCT/CN2025/090326 filed on Apr. 22, 2025, which claims the benefit of Chinese patent application No. 202411110660.5 filed on Aug. 14, 2024, and Chinese patent application No. 202410538292.8 filed on Apr. 30, 2024. All of the foregoing Chinese patent applications are hereby incorporated herein by reference in their entireties.

TECHNICAL FIELD

The present disclosure relates to the field of gas transportation and gas permeation and leakage test, and in particular to a gas permeation and leakage rate testing device and method for a non-metallic hydrogen transmission pipe.

BACKGROUND

Due to the special physicochemical properties of hydrogen, a traditional construction pipe must be a low-carbon and high-strength, seamless steel pipe with high material cost and is difficult to construct, thus resulting that the construction cost thereof per kilometer is about 4.5-6 million yuan. In addition, in long-term use, a problem of hydrogen embrittlement failure of the pipe material needs to be considered. The higher the hydrogen pressure and the higher the strength of the material, the more obvious the hydrogen embrittlement and hydrogen induced cracking phenomenon will be, which will inevitably lead to pipe damage in pipe use. Therefore, use of a non-metallic material to construct a long distance hydrogen transmission pipe is a way to solve the high material cost of hydrogen pipe construction.

However, non-metallic pipes have a problem of hydrogen permeation and leakage. Hydrogen permeation will lead to the deterioration of mechanical properties of the non-metallic pipes, and also will lead to hydrogen leakage, affecting safety and delivery efficiency of the non-metallic pipes, which is currently the biggest factor limiting the application of non-metallic materials in the field of hydrogen transmission. In practice, non-metallic hydrogen transmission pipes may be used for the transportation of pure hydrogen or hydrogen-doped gases, such as hydrogen-doped natural gas. Therefore, it is necessary to carry out permeation and leakage rate tests of hydrogen and other gases for the non-metallic hydrogen transmission pipes, and to develop gas permeation and leakage rate testing equipment for the non-metallic hydrogen transmission pipes.

The earlier patent of the applicant with the application number of ZL202210747875.2, titled "Device and method for testing hydrogen permeability of a non-metallic pipe", describes a device and method for testing hydrogen permeability of a non-metallic pipe, which has a good testing efficiency and calculation accuracy for the non-metallic pipe. However, in practical application, it is found that the device and method have at least the following defects: First, the test may usually only be performed on a pipe of specific shape and outer diameter, and the outer diameter of the pipe and an inner diameter of a test cylinder need to be accurately matched, so that it cannot be used universally for testing multiple specifications of pipes. Second, in the gas permeation and leakage rate test of non-metallic pipes, the size of a volume of a testing chamber greatly influences the test accuracy, but it is difficult to accurately measure the volume of the testing chamber. The difficulty of accurate measurement is mainly reflected in the following aspects:

(1) A tested pipe needs to be sealed at two ends during the permeation and leakage test, and a sealing element is a workpiece with an irregular shape, whose volume itself is difficult to be measured accurately; besides, a fit between the sealing element and the tested pipe has to be considered, which makes the measurement of the volume even more difficult;

(2) There is a need for a circumferential reinforcement and an axial reinforcement outside the tested pipe, and the volume thereof is fixed, but it is necessary to consider a connector between them and the tested pipe, which is often a large number of bolts and nuts, and their volume is difficult to be measured accurately;

(3) When high-pressure hydrogen is filled into the tested pipe, a deformation will occur to the pipe inevitably, which may occur locally or as a whole, and a volume change generated by the deformation of the pipe is also difficult to measure;

(4) The testing chamber needs to reserve a lot of sensor interfaces, valve joints, etc., and volume measurements thereof are often difficult.

In a gas permeation and leakage rate test of the non-metallic pipe, it is also necessary to explore an influence of a change of air pressure of an interior of the pipe on deformation of the pipe, so the measurement of the deformation of the pipe is necessary, but in a vacuum environment of the testing chamber, use of displacement sensors, strain gauges, and the like to measure the deformation of the pipe is often limited, and an accuracy of the measured deformation of the pipe is poor.

SUMMARY

The present disclosure provides a gas permeation and leakage rate testing device and method for a non-metallic hydrogen transmission pipe, in order to solve a technical problem of inaccurate gas permeation and leakage rate test due to difficult or inaccurate volume measurement.

In order to solve the above technical problem, an embodiment of the present disclosure provides a gas permeation and leakage rate testing device for a non-metallic hydrogen transmission pipe, including: a testing member, the testing member being formed with a testing cavity adapted to placing a to-be-tested pipe, where the testing cavity is formed with a sealed testing chamber after the to-be-tested pipe is placed therein; a calibration chamber, the calibration chamber being selectively communicated with the testing chamber; a first gas-filling assembly, the first gas-filling assembly being selectively communicated with the calibration chamber to be adapted to filling a gas into the calibration chamber to a first set pressure; a second gas-filling assembly, the second gas-filling assembly being selectively communicated with the to-be-tested pipe to be adapted to filling the gas into the to-be-tested pipe to a second set pressure; a measuring unit, the measuring unit being configured to measure a pressure and a temperature in the calibration chamber and a pressure and a temperature in the testing chamber, and to calculate a calculated volume of the testing chamber based on a first pressure and a first temperature in the calibration chamber and a second pressure and a second temperature in the testing chamber before the calibration chamber is communicated with the testing chamber, and a third pressure and a third temperature in the testing chamber after the calibration chamber is communicated with the testing chamber and after permeation and leakage of the to-be-tested pipe reach equilibrium; a permeation and leakage rate testing unit, the permeation and leakage rate testing unit being configured to obtain a pressure change value of the testing chamber in a preset time interval, and to calculate a gas permeation and leakage rate of the to-be-tested pipe based on the preset time interval, the pressure change value, a current temperature in the testing chamber, and the calculated volume of the testing chamber after the permeation and leakage of the to-be-tested pipe reaches the equilibrium.

The measuring unit calculates the calculated volume of the testing chamber based on Equation 2:

$$V_2 = \frac{P_3 - \frac{P_1}{T_1}T_3}{\frac{P_2}{T_2}T_3 - P_3} V_1, \quad \text{(Equation 2)}$$

where $V_1$ represents a calculated volume of the calibration chamber, $V_2$ represents the calculated volume of the testing chamber, $P_1$ represents the first pressure, $P_2$ represents the second pressure, $P_3$ represents the third pressure, $T_1$ represents the first temperature, $T_2$ represents the second temperature, and $T_3$ represents the third temperature.

As a preferred embodiment, the permeation and leakage rate testing unit calculates the gas permeation and leakage rate of the to-be-tested pipe based on Equation 1:

$$J = \frac{\Delta P V_2}{RTL\Delta t}, \quad \text{(Equation 1)}$$

where, J represents the gas permeation and leakage rate of the non-metallic hydrogen transmission pipe, $\Delta P$ represents the pressure change value, $\Delta t$ represents the preset time interval, $V_2$ represents the calculated volume of the testing chamber, R represents a molar gas constant, T represents the current temperature in the testing chamber, and L represents a length of the to-be-tested pipe.

As a preferred embodiment, the measuring unit includes: a first temperature sensor and a first pressure sensor set corresponding to the calibration chamber; a second temperature sensor and a second pressure sensor set corresponding to the testing chamber.

As a preferred embodiment, the measuring unit further includes: a first temperature control assembly provided corresponding to the calibration chamber; and a second temperature control assembly provided corresponding to the testing chamber, and the first temperature control assembly and the second temperature control assembly are configured to adjust the second temperature to be the same as the first temperature.

As a preferred embodiment, in a case where the first temperature is the same as the second temperature, the measuring unit calculates the calculated volume of the testing chamber based on Equation 3:

$$V_2 = \frac{P_3 - P_1}{P_2 - P_3} V_1, \quad \text{(Equation 3)}$$

where $V_1$ represents the calculated volume of the calibration chamber, $V_2$ represents the calculated volume of the testing chamber, $P_1$ represents the first pressure, $P_2$ represents the second pressure, and $P_3$ represents the third pressure.

As a preferred embodiment, a sum of a volume of the calibration chamber and an internal volume of a tube communicated with the calibration chamber is greater than or equal to 1/10 of a sum of a volume of the testing chamber and an internal volume of a tube communicated with the testing chamber, and the sum of the volume of the calibration chamber and the internal volume of the tube communicated with the calibration chamber is less than or equal to two times the sum of the volume of the testing chamber and the internal volume of the tube communicated with the testing chamber.

As a preferred embodiment, the to-be-tested pipe includes a non-metallic pipe and a connecting joint connected to the non-metallic pipe, and the connecting joint is any one of a hot-melt joint, an electrofusion joint, and a mechanical joint.

As a preferred embodiment, the gas includes at least one of hydrogen, helium, natural gas, nitrogen, methane, mashgas, and carbon dioxide.

The present disclosure also provides a gas permeation and leakage rate testing method for a non-metallic hydrogen transmission pipe, using the gas permeation and leakage rate testing device described in any of the above embodiments, including: after the to-be-tested pipe is placed in the testing cavity and then the testing cavity is formed with a sealed testing chamber, vacuumizing the testing chamber; discharging air from the to-be-tested pipe and filling the gas into the to-be-tested pipe to the second set pressure; in the event where a gas permeation and leakage in the to-be-tested pipe reaches the equilibrium, obtaining the pressure change value of the testing chamber in the preset time interval, and calculating the gas permeation and leakage rate of the to-be-tested pipe based on the preset time interval, the pressure change value, the calculated volume of the testing chamber, and the current temperature in the testing chamber.

The present disclosure also provides a method for testing a volume expansion amount of a non-metallic hydrogen transmission pipe, using the gas permeation and leakage rate testing device described in any of the above embodiments, including: before performing the gas permeation and leakage rate test, calculating a first volume of the testing chamber by the measuring unit based on Equation 2:

$$V_2 = \frac{P_3 - \frac{P_1}{T_1}T_3}{\frac{P_2}{T_2}T_3 - P_3} V_1, \quad \text{(Equation 2)}$$

where $V_1$ represents the calculated volume of the calibration chamber, $V_2$ represents the calculated volume of the testing chamber, $P_1$ represents the first pressure, $P_2$ represents the second pressure, $P_3$ represents the third pressure, $T_1$ represents the first temperature, $T_2$ represents the second temperature, and $T_3$ represents the third temperature; performing the gas permeation and leakage rate testing method of the non-metallic pipe; calculating a second volume of the testing chamber based on Equation 2 by the measuring unit after the test is completed, and calculating a volume expansion amount of the to-be-tested pipe based on a difference between the first volume and the second volume.

Compared with the prior art, the embodiments of the present disclosure have following beneficial effects:

1, in the present disclosure, the calculated volume of the testing chamber is accurately calibrated by adding the calibration chamber and by measuring the pressure and temperature changes in the testing chamber, and the device is capable of being applied to a measurement of the calculated volume of the testing chamber of any shape. The device avoids a problem of difficult measurement of a volume due to a complex structure of pipe joints and connecting tubes, thereby achieving that one set of equipment can measure the calculated volume of the testing chamber in the testing member after different structural configurations and different shapes of the to-be-tested pipes are placed in the testing member.

2, the testing member of the present disclosure is capable of accommodating different shapes and different specifications of to-be-tested pipes and connecting tubes, so as to improve the accuracy of the gas permeation and leakage rate testing data of the non-metallic hydrogen transmission pipe by accurately measuring a calculated volume change of the testing chamber.

Additional aspects and advantages of the present disclosure will be given in part in the following description, become apparent in part from the following description, or be learned through the practice of the present disclosure.

Figure 1:
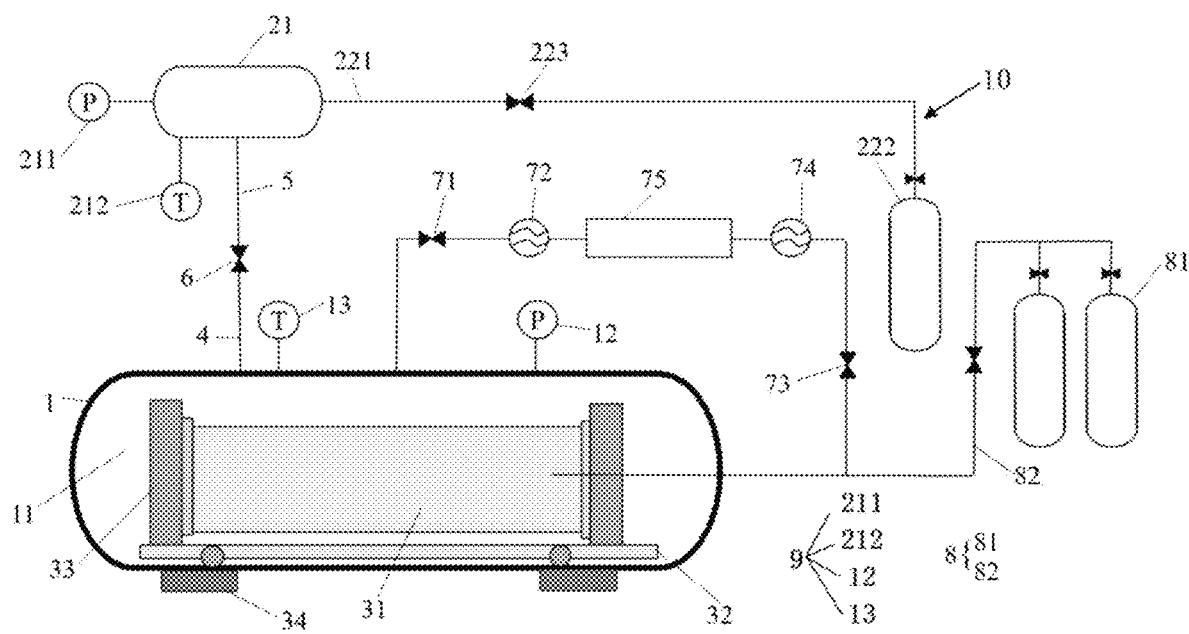
FIG. 1 is schematic diagram of a structure of a gas permeation and leakage rate testing device for a non-metallic hydrogen transmission pipe of the present disclosure.

Where, the reference signs of the accompanying drawings are as follows:

1—testing member; 11—testing chamber; 12—second pressure sensor; 13—second temperature sensor; 14—second temperature control assembly; 16—testing cavity; 21—calibration chamber; 211—first pressure sensor; 212—first temperature sensor; 221—third tube; 222—first high-pressure gas supply; 223—second valve; 23—first temperature control assembly; 31—to-be-tested pipe; 32—supporting seat; 33—sealing element; 34—cushion block; 4—first tube; 5—second tube; 6—first valve; 71—third valve; 72—first vacuum pump; 73—fourth valve; 74—second vacuum pump; 75—exhaust gas treatment system; 8—second gas-filling assembly; 81—second high-pressure gas supply; 82—fourth tube; 9—measuring unit; and 10—first gas-filling assembly.

DETAILED DESCRIPTION

The technical solutions in the embodiments of the present disclosure will be described clearly and completely in the following in conjunction with the accompanying drawings in the embodiments of the present disclosure, and it is obvious that the described embodiments are only a part of the embodiments of the present disclosure and not all of the embodiments. Based on the embodiments of the present disclosure, all other embodiments obtained by a person of ordinary skill in the art without making creative efforts shall fall within the protection scope of the present disclosure.

An embodiment of the present disclosure provides a gas permeation and leakage rate testing device for a non-metallic hydrogen transmission pipe. The gas permeation and leakage rate testing device for the non-metallic hydrogen transmission pipe includes a volume measuring device and a permeation and leakage rate testing unit, and the volume measuring device includes a testing member 1, a calibration chamber 21, a first gas-filling assembly 10, a second gas-filling assembly 8, and a measuring unit 9.

Figure 2:
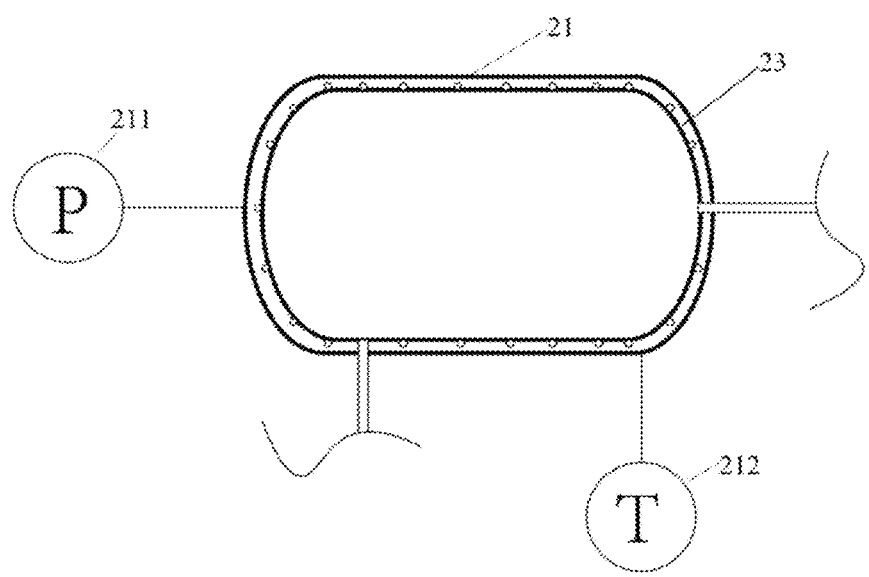
FIG. 2 is a schematic diagram of a structure of a calibration chamber in a gas permeation and leakage rate testing device for a non-metallic hydrogen transmission pipe of the present disclosure.
Figure 3:
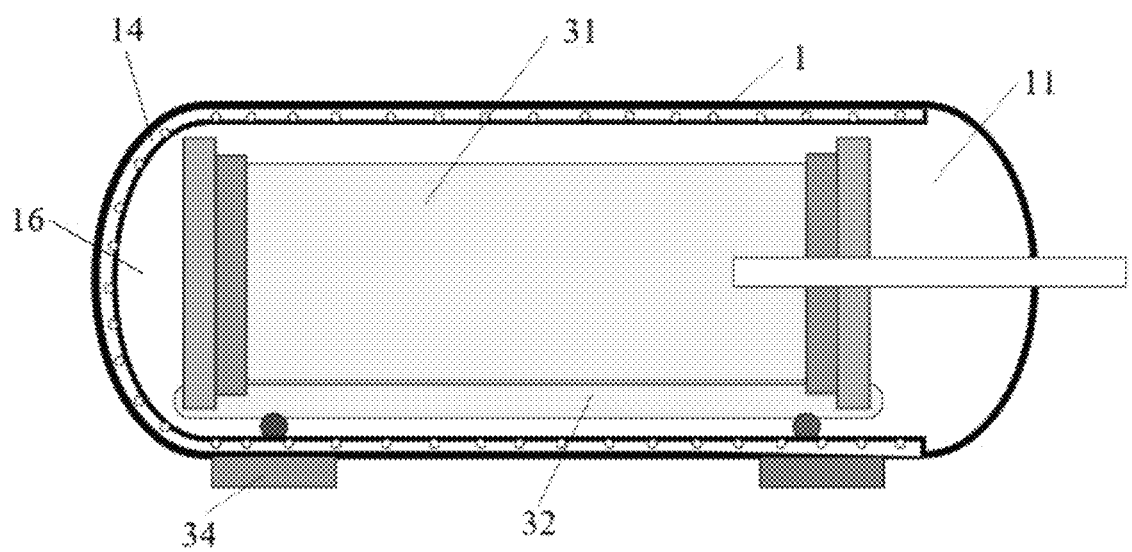
FIG. 3 is a schematic diagram of an internal structure of a testing member of a gas permeation and leakage rate testing device for a non-metallic hydrogen transmission pipe of the present disclosure.

Referring to FIGS. 1 to 3, the testing member 1 is formed with a testing cavity 16 adapted to placing a to-be-tested pipe 31, and the testing cavity 16 is formed with a sealed testing chamber 11 after the to-be-tested pipe 31 is placed inside the testing cavity 16, that is, an interior of the testing member 1 is a cavity, and a portion of the testing cavity 16 inside the testing member 1 which is not occupied forms the testing chamber 11. The testing chamber 11 formed inside the testing member 1 may be of any shape, that is, as the to-be-tested pipe 31 may be of any shape, and thus the testing chamber 11, i.e, the portion of the testing cavity 16 which is not occupied, may be of any shape.

The calibration chamber 21 is selectively communicated with the testing chamber 11, that is, a communication relationship between the calibration chamber 21 and the testing chamber 11 may be controlled to be communicated or not communicated with each other by means of a control component such as a valve; the first gas-filling assembly 10 is selectively communicated with the calibration chamber 21 to be adapted to filling a gas into the calibration chamber 21 to a first set pressure, and the first set pressure may be set according to an actual measurement condition. That is, an interior of the calibration chamber 21 is a cavity which forms an accommodating cavity for accommodating the gas, and when the calibration chamber 21 is in communication with the first gas-filling assembly 10, the first gas-filling assembly 10 fills a gas into the calibration chamber 21; and when the calibration chamber 21 is in communication with the testing chamber 11, the gas in the calibration chamber 21 mixes with a gas in the testing chamber 11.

The measuring unit 9 is configured to measure a pressure and a temperature in the calibration chamber 21 and a pressure and a temperature in the testing chamber 11 so as to calculate a calculated volume of the testing chamber 11 based on a first pressure and a first temperature in the calibration chamber 21 and a second pressure and a second temperature in the testing chamber 11 before the calibration chamber 21 is communicated with the testing chamber 11, and a third pressure and a third temperature in the testing chamber 11 after the calibration chamber 21 is communicated with the testing chamber 11. It should be understood that the measurement, by the measuring unit 9, of the third pressure and the third temperature in the testing chamber 11 after the calibration chamber 21 is communicated with the testing chamber 11 may be performed before or after a gas permeation and leakage rate test of the to-be-tested pipe 31.

As a preferred embodiment, the measuring unit 9 includes: a first temperature sensor 212 and a first pressure sensor 211 provided corresponding to the calibration chamber 21, where the first temperature sensor 212 is configured to measure the temperature in the calibration chamber 21, and the first pressure sensor 211 is configured to measure the pressure in the calibration chamber 21; a second temperature sensor 13 and a second pressure sensor 12 provided corresponding to the testing chamber 11, where the second temperature sensor 13 is configured to measure the temperature in the testing chamber 11, and the second pressure sensor 12 is configured to measure the pressure in the testing chamber 11. Where, the first temperature sensor 212 and the second temperature sensor 13 may be a thermocouple temperature sensor, a resistive temperature sensor, an infrared temperature sensor, etc., as long as they are capable of achieving a measurement of the temperatures in the calibration chamber 21 and in the testing chamber 11. The measuring unit 9, which measures the pressure in the calibration chamber 21 and the pressure in the testing chamber 11, may be an instrument capable of achieving a measurement of the pressures in the calibration chamber 21 and in the testing chamber 11, such as a pressure gauge.

In the present disclosure, the interior of the testing member 1 is the cavity, and an internal space thereof is the testing cavity 16, and after a to-be-tested pipe 31 is placed inside the testing cavity 16, a portion of the testing cavity 16 which is not occupied by the to-be-tested pipe 31 forms the testing chamber 11. The measuring unit 9 is configured to measure the pressure and the temperature in the testing chamber 11 and the calibration chamber. The calibration chamber 21 is selectively communicated with the first gas-filling assembly 10, and the calibration chamber 21 is selectively communicated with the testing chamber 11. The first gas-filling assembly 10 is selectively communicated with the calibration chamber 21 through a tube and is configured to fill the gas into the calibration chamber 21. When the calculated volume of the testing chamber 11 needs to be calibrated by using the calibration chamber 21, the first gas-filling assembly 10 is communicated with the calibration chamber 21 and the calibration chamber 21 is in a non-communicated state with the testing chamber 11 at this time, the first gas-filling assembly 10 fills the gas into the calibration chamber 21 to the first set pressure, and then the communication relationship between the first gas-filling assembly 10 and the calibration chamber 21 is closed, the first pressure and the first temperature in the calibration chamber 21 are recorded, and the second pressure and the second temperature in the testing chamber are recorded; when the calibration chamber 21 is communicated with the testing chamber 11, the gas in the calibration chamber 21 is mixed with the gas in the testing chamber 11, the third temperature and the third pressure in the testing chamber 11 are recorded, and then the calculated volume of the testing chamber 11 is calculated.

In the present disclosure, the calculated volume of the testing chamber 11 is accurately calibrated by adding the calibration chamber 21, and a calculated volume of the calibration chamber 21 is accurately obtained based on a measured pressure change and a measured temperature change in the testing chamber 11. The volume measuring device may be applied to a measurement of the calculated volume of the testing chamber 11 in any shape, i.e., any shape of the to-be-tested pipe 31 or a connecting joint may be applied inside the testing member 1 of the volume measuring device. Difficulties in measuring a volume due to complex structures and inter-structural coordination are avoided, thereby achieving that one set of equipment can measure the calculated volume of the testing chamber 11 in the testing member 1 after different structural configurations and different shapes of the to-be-tested pipes 31 or the connecting joints are placed in the testing member 1.

Specifically, the testing chamber 11 and the calibration chamber 21 are communicated by a first tube 4 and a second tube 5, a first valve 6 is provided at a joint of the first tube 4 and the second tube 5, the first tube 4 is communicated with the testing chamber 11, and the second tube 5 is communicated with the calibration chamber 21. When the calculated volume of the testing chamber 11 needs to be calibrated by using the calibration chamber 21, the first gas-filling assembly 10 is communicated with the calibration chamber 21 and the calibration chamber 21 is in a non-communicated state with the testing member 1 at this time, the gas is filled into the calibration chamber 21 to the first set pressure by the first gas-filling assembly 10, and then the communication relationship between the first gas-filling assembly 10 and the calibration chamber 21 is closed, the first pressure and the first temperature in the calibration chamber 21 are recorded, and the second pressure and the second temperature in the testing chamber 11 are recorded; the first valve 6 is opened to communicate the calibration chamber 21 with the testing chamber 11, the gas in the calibration chamber 21 is mixed with the gas in the testing chamber 11 through the second tube 5 and the first tube 4, the third temperature and the third pressure in the testing chamber 11 are recorded, and then the calculated volume of the testing chamber 11 is calculated.

More specifically, the first gas-filling assembly 10 includes a third tube 221 and a first high-pressure gas supply 222, the third tube 221 is disposed between the calibration chamber 21 and the first high-pressure gas supply 222 and is configured to communicate the calibration chamber 21 with the first high-pressure gas supply 222, and the third tube 221 is provided with a second valve 223. A portion of the third tube, between the calibration chamber 21 and the second valve 223, is always in a communicated state with the calibration chamber 21, and an internal volume of the portion of the third tube should be included when calculating the calculated volume of the calibration chamber 21. The calibration chamber 21 is also always in a communicated state with the second tube 5, and an internal volume of the second tube 5 should also be included when calculating the calculated volume of the calibration chamber 21. Thus, the calculated volume of the calibration chamber is equal to a sum of the volume of the calibration chamber 21, the internal volume of the second tube 5 that is in communication with the calibration chamber 21, and the internal volume of the portion of the third tube 221 between the calibration chamber 21 and the second valve 223. When the calculated volume of the testing chamber 11 needs to be calibrated by using the calibration chamber 21, the second valve 223 is opened so that the first high-pressure gas supply 222 is communicated with the calibration chamber 21 through the third tube 221, the calibration chamber 21 is in a non-communicated state with the testing chamber 11 at this time, the first high-pressure gas supply 222 fills a gas into the calibration chamber 21 to the first set pressure, then the second valve 223 is closed, that is, the communication relationship between the first high-pressure gas supply 222 and the calibration chamber 21 is closed, the first pressure and the first temperature in the calibration chamber 21 are recorded, and the second pressure and the second temperature in the testing chamber 11 are recorded. The first valve 6 is opened to communicate the calibration chamber 21 with the testing chamber 11, the gas in the calibration chamber 21 enters the testing chamber 11 through the second tube 5 and the first tube 4, and the third temperature and the third pressure in the testing chamber 11 are recorded, and then the calculated volume of the testing chamber 11 is calculated. The measurement process of the calculated volume of the testing chamber 11 may be performed before or after the gas permeation and leakage rate test is performed on the to-be-tested pipe 31.

It should be understood that the testing member 1, the calibration chamber 21, all connecting tubes, and control valves in the present disclosure are all made of hydrogen-resistant materials, such as austenitic stainless steel, low-alloy steel, precipitation-strengthened austenitic alloy, and aluminum alloy, and the like.

As a preferred embodiment, the volume measuring device further includes a second gas-filling assembly 8, the second gas-filling assembly 8 is selectively communicated with the to-be-tested pipe 31 to be adapted to filling a gas into the to-be-tested pipe 31 to a second set pressure, and a value of the second set pressure may be preset. Where after the gas is filled into the to-be-tested pipe 31 to the second set pressure, the measuring unit 9 is further configured to calculate the calculated volume of the testing chamber 11 based on the first pressure and the first temperature in the calibration chamber 21 and the second pressure and the second temperature in the testing chamber 11 before the calibration chamber 21 is communicated with the testing chamber 11, and the third pressure and the third temperature in the testing chamber 11 after the calibration chamber 21 is communicated with the testing chamber 11.

Specifically, the second gas-filling assembly 8 is selectively communicated with the to-be-tested pipe 31 to fill the gas into the to-be-tested pipe 31. The interior of the testing member 1 is the cavity, and the to-be-tested pipe 31 may be placed in the internal space of the testing member 1 so that there is an unoccupied portion of the cavity inside the testing member 1, the unoccupied portion of the cavity forms the testing chamber 11. When the gas permeation and leakage rate test needs to be performed on the to-be-tested pipe 31, and/or when the calculated volume of the testing chamber 11 needs to be measured, two ends of the to-be-tested pipe 31 are sealed, then the to-be-tested pipe 31 is placed in the testing member 1, and then the testing member 1 is sealed, at the moment, the testing chamber 11 is formed inside the testing member 1; the gas is filled into the to-be-tested pipe 31 through the second gas-filling assembly 8 to the second set pressure; and the calculated volume of the testing chamber 11 is then calculated based on the first pressure and the first temperature in the calibration chamber 21 and the second pressure and the second temperature in the testing chamber 11 before the calibration chamber 21 is communicated with the testing chamber 11, and the third pressure and the third temperature in the testing chamber 11 after the calibration chamber 21 is communicated with the testing chamber 11. It should be understood that after the second gas-filling assembly 8 fills the gas into the to-be-tested pipe 31, the gas permeation and leakage rate test is first performed on the to-be-tested pipe 31, and after the gas permeation and leakage rate test of the to-be-tested pipe 31 has been completed, the calculated volume of the testing chamber 11 is then calibrated by the measuring unit 9. Where the completion of the gas permeation and leakage rate test of the to-be-tested pipe 31 means that, after gas permeation and leakage of the to-be-tested pipe 31 reaches equilibrium, a pressure change in the testing chamber 11 in a preset time interval, a current temperature in the testing chamber 11, and the calculated volume of the testing chamber 11 are measured and then a gas permeation and leakage rate of the to-be-tested pipe 31 is obtained. By measuring the first temperature and the first pressure in the calibration chamber and the second temperature and the second pressure in the testing chamber before the testing chamber 11 is communicated with the calibration chamber 21, and the third pressure and the third temperature in the testing chamber 11 after the testing chamber 11 is communicated with the calibration chamber 21, a current calculated volume of the testing chamber 11 is then calculated. Since the gas permeation and leakage rate test has already been performed on the to-be-tested pipe 31, the to-be-tested pipe 31 has an expansion caused by an internal gas pressure at this time, so the calculated volume of the testing chamber 11 is a volume after considering expansion and deformation of the to-be-tested pipe 31, which solves a problem that there is an error in a measurement of the calculated volume of the sealed testing chamber 11 due to the expansion and deformation of the to-be-tested pipe 31 in a testing process, thus achieving more accurate data of the gas permeation and leakage rate test of the to-be-tested pipe 31.

It should be understood that, after the two ends of the to-be-tested pipe 31 are sealed, the gas may be filled into the to-be-tested pipe 31 by the second gas-filling assembly 8, then the to-be-tested pipe 31 may be placed into the testing member 1, and then the testing member 1 may be sealed; alternatively, after the two ends of the to-be-tested pipe 31 are sealed, the to-be-tested pipe 31 may be first placed into the testing member 1, and the testing member 1 may be sealed, and then the gas may be filled into the to-be-tested pipe 31 by the second gas-filling assembly 8.

After sealing the two ends of the to-be-tested pipe 31 and placing the to-be-tested pipe 31 in the testing member 1, the testing member 1 is sealed. Because the to-be-tested pipe 31 is placed in the testing member 1, which occupies a volume of the testing member 1, and an unoccupied portion of the internal space of the testing member 1 is the testing chamber 11, after the gas permeation and leakage of the to-be-tested pipe 31 reaches the equilibrium, a calculated volume change and the pressure change in the testing chamber 11 are measured to obtain the gas permeation and leakage rate of the to-be-tested pipe 31. The calculated volume of the testing chamber 11 is calibrated by the volume measuring device, and the calculated volume of the testing chamber 11 is measured according to an ideal gas equation of state and the method described herein. The measurement of the calculated volume of the testing chamber 11 is not limited by structure or shape, that is, any style of the testing chamber 11 is formed by placing a pipe of any shape or any structure in the testing member 1 in any manner, the calculated volume of the testing chamber 11 may be measured according to a volume measuring method described herein. In a process of the gas permeation and leakage rate test of the to-be-tested pipe 31, there is no need to consider the shape and structure of the pipe or the shape and structure of other elements communicated with the pipe, and the calculated volume of the testing chamber 11 may be calibrated by the volume measuring method described herein, so as to obtain the gas permeation and leakage rate of the to-be-tested pipe 31.

As a preferred embodiment, the second gas-filling assembly 8 includes a second high-pressure gas supply 81 and a fourth tube 82, the second high-pressure gas supply 81 is communicated with the to-be-tested pipe 31 through the fourth tube 82, and a valve is provided on the fourth tube 82. Opening the valve, the second high-pressure gas supply 81 fills a gas into the to-be-tested pipe 31; and closing the valve, the second high-pressure gas supply 81 is not communicated with the to-be-tested pipe 31, and the second high-pressure gas supply 81 stops filling the gas into the to-be-tested pipe 31.

As a preferred embodiment, the to-be-tested pipe 31 includes a non-metallic pipe and a connecting joint connected to the non-metallic pipe, and the connecting joint is any one of a hot-melt joint, an electrofusion joint, and a mechanical joint. That is to say, the to-be-tested pipe 31 may be the non-metallic pipe, or it may be a whole of the non-metallic pipe and the connecting joint connected to the non-metallic pipe, where the connecting joint may be any one of the hot-melt joint, the electrofusion joint, the mechanical joint, and the like. A gas permeation and leakage rate testing method for a non-metallic hydrogen transmission pipe of the present disclosure may be used to measure gas permeation and gas leakage of the non-metallic pipe and the connecting joint connected to the non-metallic pipe. It should be understood that if the gas needs to be filled into the to-be-tested pipe 31 after the to-be-tested pipe 31 is placed in the testing member 1, the tube for communicating the second high-pressure gas supply 81 with the to-be-tested pipe 31 should be in communication with the second high-pressure gas supply 81 at one end, and an other end of the pipe should pass through a side wall of the testing member 1 and enter the interior of the testing member 1 to be in communication with the to-be-tested pipe 31.

As a preferred embodiment, a test gas used in the gas permeation and leakage rate test for the non-metallic hydrogen transmission pipe includes at least one of hydrogen, helium, natural gas, nitrogen, methane, mashgas, and carbon dioxide, i.e., the test gas may be one of the hydrogen, helium, natural gas, nitrogen, methane, mashgas, or carbon dioxide, or may be a mixture of multiple gases, such as hydrogen-doped natural gas. It should be understood that the non-metallic hydrogen transmission pipe may be used not only for transportation of pure hydrogen, but also for transportation of a hydrogen-doped gas, such as the hydrogen-doped natural gas. Therefore, in order to explore a permeation and leakage rate of the hydrogen-doped mixed gas, a gas permeation and leakage test for the non-metallic hydrogen transmission pipe needs to be carried out to test gases, such as hydrogen, helium, natural gas, nitrogen, methane, mashgas, carbon dioxide, and their mixtures.

As a preferred embodiment, the volume measuring device further includes a first temperature control assembly 23 provided corresponding to the calibration chamber 21 to adjust the first temperature to be the same as the second temperature. The calibration chamber 21 is provided therein with the first temperature control assembly 23 to regulate a temperature of the gas inside the calibration chamber 21. When a temperature in the calibration chamber 21 and a temperature in the testing chamber 11 are different, a sensor transmits a signal to a controller, the controller sends a corresponding command according to a temperature difference between the temperature in the calibration chamber 21 and the temperature in the testing chamber 11, and an actuator executes the command sent by the controller to regulate the temperature in the calibration chamber 21, so that the temperature in the calibration chamber 21 is the same as the temperature in the testing chamber 11, thereby facilitating calculation of the calculated volume of the testing chamber 11. The sensor may be a temperature sensor, the controller may be a single-chip microcomputer, and the actuator may regulate the temperature by controlling flow of hot water or cold water through a solenoid valve.

As a preferred embodiment, the volume measuring device further includes a second temperature control assembly 14 provided corresponding to the testing chamber 11 to adjust the second temperature to be the same as the first temperature. The testing member 1 is provided with the second temperature control assembly 14 corresponding to the testing chamber 11 to regulate a temperature of the gas inside the testing chamber 11. When the temperature in the calibration chamber 21 and the temperature in the testing chamber 11 are different, the sensor transmits the signal to the controller, the controller sends the corresponding command according to the temperature difference between the temperature in the calibration chamber 21 and the temperature in the testing chamber 11, and the actuator executes the command sent by the controller to regulate the temperature in the testing chamber 11, so that the temperature in the testing chamber 11 is the same as the temperature in the calibration chamber 21, thereby facilitating calculation of the calculated volume of the testing chamber 11.

It should be understood that, in the present disclosure, it may only the calibration chamber 21 be provided therein with the first temperature control assembly 23 to regulate the temperature in the calibration chamber 21, so that the temperature in the calibration chamber 21 is kept to be the same as the temperature in the testing chamber 11, and the testing chamber 11 may not be provided therein with a temperature control assembly; alternatively, it may the testing chamber 11 be provided therein with the second temperature control assembly 14 to regulate the temperature in the testing chamber 11, so that the temperature in the testing chamber 11 is kept to be the same as the temperature in the calibration chamber 21, and the calibration chamber 21 may not be provided therein with the temperature control assembly; preferably, the calibration chamber 21 is provided with the first temperature control assembly 23, and the testing chamber 11 is provided with the second temperature control assembly 14, and the temperatures in the testing chamber 11 and the calibration chamber 21 are regulated at the same time, to ensure that the temperatures in the testing chamber 11 and the calibration chamber 21 are kept the same, i.e., to keep the first temperature, the second temperature, and the third temperature the same. In other words, the first temperature control assembly 23 and/or the second temperature control assembly 14 are provided to keep the temperatures in the testing chamber 11 and the calibration chamber 21 the same during the measurement of the calculated volume of the testing chamber 11, thereby facilitating the measurement of the calculated volume of the testing chamber 11. Specific providing of the first temperature control assembly 23 in the calibration chamber 21 and the second temperature control assembly 14 in the testing chamber 11 may be determined according to specific conditions.

In a possible embodiment, the first temperature control assembly 23 may include a plurality of temperature sensors provided in the calibration chamber 21 such that a temperature of each area in the calibration chamber 21 may be controlled, to ensure that the temperatures of various areas in the calibration chamber 21 are the same. The second temperature control assembly 14 includes a plurality of temperature sensors disposed on an inner wall of the testing member 1, such that a temperature of each area in the testing chamber 11 may be controlled, to ensure that the temperatures of various areas in the testing chamber 11 are the same.

Specifically, the measuring unit calculates the calculated volume of the testing chamber based on Equation 2:

$$V_2 = \frac{P_3 - \frac{P_1}{T_1}T_3}{\frac{P_2}{T_2}T_3 - P_3} V_1, \qquad \text{(Equation 2)}$$

where, $V_1$ represents the calculated volume of the calibration chamber, $V_2$ represents the calculated volume of the testing chamber, $P_1$ represents the first pressure, $P_2$ represents the second pressure, $P_3$ represents the third pressure, $T_1$ represents the first temperature, $T_2$ represents the second temperature, and $T_3$ represents the third temperature. Considering an influence of an internal volume of the tube in an actual measurement, the calculated volume of the calibration chamber represented by $V_1$ herein should be understood as a sum of the volume of the calibration chamber and an internal volume of the tube communicated therewith, and similarly, the calculated volume of the testing chamber represented by $V_2$ should be understood as a sum of a volume of the testing chamber and an internal volume of the tube communicated therewith.

Figure 4:
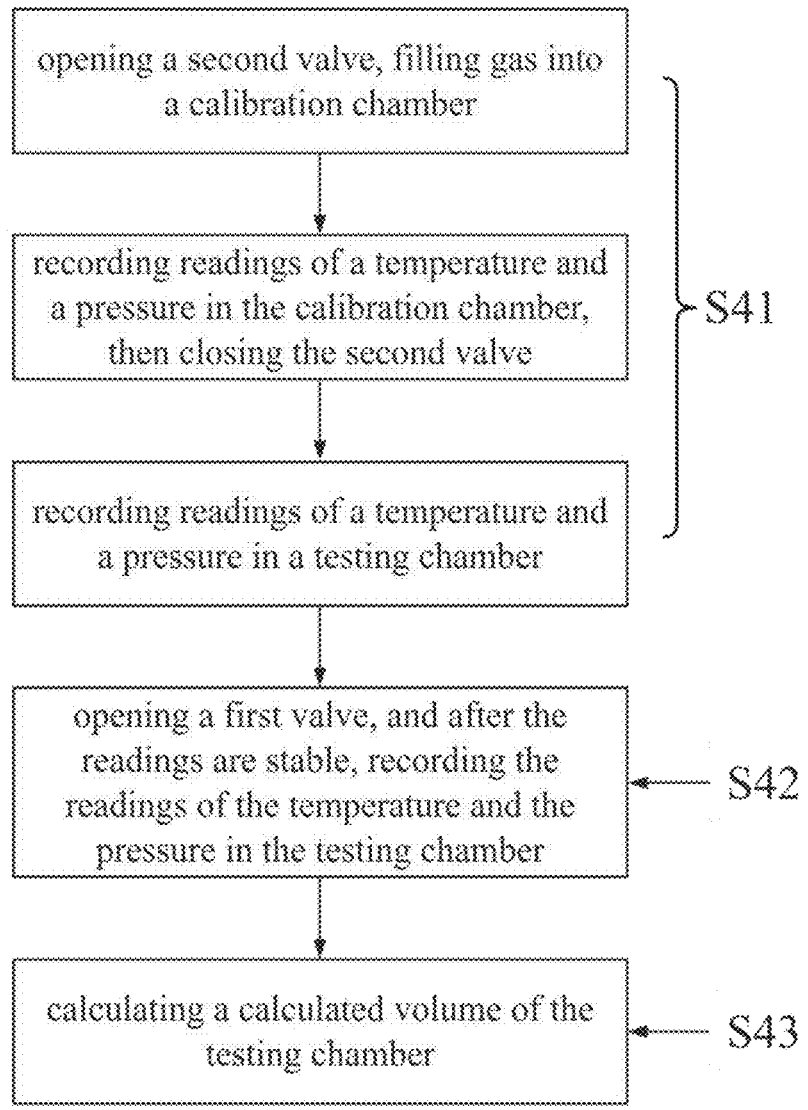
FIG. 4 is a schematic diagram of a calibration step of an embodiment of a calibration method of a volume measuring device of the present disclosure.

Specifically, referring to FIG. 4, the volume measuring method of the volume measuring device includes following steps:

Step S41: opening the second valve, filling the gas into the calibration chamber to the first set pressure through the first high-pressure gas supply of the first gas-filling assembly, recording the first pressure $P_1$ and the first temperature $T_1$ in the calibration chamber, and then closing the second valve; at this time, the first valve between the testing chamber and the calibration chamber being in a closed state, and the testing chamber and the calibration chamber being not communicated, and recording the second pressure $P_2$ and the second temperature $T_2$ in the testing chamber when the calibration chamber and the testing chamber are not communicated.

Step S42: opening the first valve between the calibration chamber and the testing chamber to communicate the calibration chamber with the testing chamber so as to make the gas in the calibration chamber and the gas in the testing chamber mix, and recording the third pressure $P_3$ and the third temperature $T_3$ in the testing chamber when the gases in the calibration chamber and in the testing chamber are mixed uniformly and reach a stable state. Where the gases in the calibration chamber and in the testing chamber are mixed uniformly means that the stable state is reached, and the pressure in the calibration chamber and the pressure in the testing chamber are in equilibrium, i.e., the pressure in the calibration chamber and the pressure in the testing chamber are the same.

Step S43: calculating the calculated volume of the testing chamber according to Equation 2:

$$V_2 = \frac{P_3 - \frac{P_1}{T_1}T_3}{\frac{P_2}{T_2}T_3 - P_3}V_1,$$ (Equation 2)

where, $V_1$ represents the calculated volume of the calibration chamber, in m³; $V_2$ represents the calculated volume of the testing chamber, in m³; $P_1$ represents the first pressure in the calibration chamber before the calibration chamber is communicated with the testing chamber, in Pa; $P_2$ represents the second pressure in the testing chamber before the calibration chamber is communicated with the testing chamber, in Pa; $P_3$ represents the third pressure in the testing chamber after the calibration chamber is communicated with the testing chamber, in Pa; $T_1$ represents the first temperature in the calibration chamber before the calibration chamber is communicated with the testing chamber, in K; $T_2$ represents the second temperature in the testing chamber before the calibration chamber is communicated with the testing chamber, in K; and $T_3$ represents the third temperature in the testing chamber after the calibration chamber is communicated with the testing chamber, in K. Considering the influence of the internal volume of the tube in the actual measurement, the calculated volume of the calibration chamber represented by $V_1$ herein should be understood as the sum of the volume of the calibration chamber and the internal volume of the tube communicated therewith. Similarly, the calculated volume of the testing chamber represented by $V_2$ should be understood as the sum of the volume of the testing chamber and the internal volume of the tube communicated therewith. A reading of the first pressure sensor, i.e., the first pressure $P_1$, and a reading of the first temperature sensor, i.e., the first temperature $T_1$, of the calibration chamber are read, and according to the ideal gas equation of state, i.e., Equation 4:

$$P_1V_1 = N_1RT_1$$ (Equation 4), where, $P_1$ represents the first pressure in the calibration chamber before the calibration chamber is communicated with the testing chamber, in Pa; $V_1$ represents the calculated volume of the calibration chamber, in m³; $N_1$ represents number of moles of the gas in the calibration chamber before the calibration chamber is communicated with the testing chamber, in mol; R represents molar gas constant, which is taken to be 8.31 J/mol/K here; $T_1$ represents the first temperature in the calibration chamber before the calibration chamber is communicated with the testing chamber, in K.

A reading of the second pressure sensor, i.e., the second pressure $P_2$, and a reading of the second temperature sensor, i.e., the second temperature $T_2$, of the testing chamber are read, and similarly, there is Equation 5:

$$P_2V_2 = N_2RT_2$$ (Equation 5), where $P_2$ represents the second pressure in the testing chamber before the calibration chamber is communicated with the testing chamber, in Pa; $V_2$ represents the calculated volume of the testing chamber, in m³; $N_2$ represents the number of moles of the gas in the testing chamber before the calibration chamber is communicated with the testing chamber, in mol; and $T_2$ represents the second temperature in the testing chamber before the calibration chamber is communicated with the testing chamber, in K.

Open the first valve so that the gas in the testing chamber and the gas in the calibration chamber are rapidly mixed, and when readings of the pressure and temperature are stable, a reading of the second pressure sensor, i.e., the third pressure $P_3$, and a reading of the second temperature sensor, i.e., the third temperature $T_3$, of the testing chamber are read, and similarly, there is Equation 6:

$$P_3(V_1+V_2) = (N_1+N_2)RT_3$$ (Equation 6), where, $P_3$ represents the third pressure in the testing chamber after the calibration chamber is communicated with the testing chamber, in Pa; and $T_3$ represents the third temperature in the testing chamber after the calibration chamber is communicated with the testing chamber, in K.

Based on above Equations 4, 5 and 6, Equation 2 may be obtained, as follows, and the calculated volume $V_2$ of the testing chamber may be obtained according to Equation 2:

$$V_2 = \frac{P_3 - \frac{P_1}{T_1}T_3}{\frac{P_2}{T_2}T_3 - P_3}V_1. \quad \text{(Equation 2)}$$

In the calibration method of the volume measuring device described in the present disclosure, the first pressure sensor on the calibration chamber measures the pressure in the calibration chamber and the tube communicated therewith; and the second pressure sensor on the testing chamber measures the pressure in the testing chamber and the tube communicated therewith. The first temperature sensor on the calibration chamber measures the temperature in the calibration chamber and the tube communicated therewith; and the second temperature sensor on the testing chamber measures the temperature in the testing chamber and the tube communicated therewith.

The first temperature control assembly may be added to the interior of the calibration chamber, and the second temperature control assembly may be added to the interior of the testing member, which may control the temperature in the calibration chamber to be the same as the temperature in the testing chamber and maintain a constant temperature environment throughout the testing process, i.e., $T_1=T_2=T_3$ as described above.

Therefore, Equation 3 may be obtained, as follows, and the calculated volume $V_2$ of the testing chamber is obtained according to Equation 3:

$$V_2 = \frac{P_3 - P_1}{P_2 - P_3}V_1. \quad \text{(Equation 3)}$$

In this embodiment, when the calculated volume of the testing chamber is calibrated by using the calibration chamber, the first pressure $P_1$ in the calibration chamber is not less than two times the second pressure $P_2$ in the testing chamber, and the first pressure $P_1$ in the calibration chamber is not greater than 10,000 times the second pressure $P_2$ in the testing chamber which ensures that the pressure change in the testing chamber, after the calibration chamber is communicated with the testing chamber, can be clearly sensed and accurately displayed by the second pressure sensor.

As a preferred embodiment, the sum of the volume of the calibration chamber 21 and the internal volume of the tube communicated therewith is greater than or equal to 1/10 of the sum of the volume of the testing chamber 11 and the internal volume of the tube communicated therewith, and the sum of the volume of the calibration chamber 21 and the internal volume of the tube communicated therewith is less than or equal to two times the sum of the volume of the testing chamber 11 and the internal volume of the tube communicated therewith.

In this embodiment, in order to accurately calibrate the calculated volume of the testing chamber 11, the volume of the calibration chamber 21 and the internal volume of the tube communicated therewith should not be too small, otherwise the pressure change in the testing chamber 11 after the calibration chamber 21 is communicated with the testing chamber 11 is too small, and a change in a value of the second pressure sensor 12 is too small, which will increase a calculation error of the calculated volume of the testing chamber 11, therefore, the sum of the volume of the calibration chamber 21 and the internal volume of the tube communicated therewith should be not less than 1/10 of an estimated sum of the volume of the testing chamber 11 and the internal volume of the tube communicated therewith. By limiting the calculated volume of the calibration chamber 21 in the present disclosure, it avoids a problem of an overlarge error in the measurement caused by the too small calculated volume of the calibration chamber 21, and improves an accuracy of results of the gas permeation and leakage rate test of the to-be-tested pipe 31. And the sum of the volume of the calibration chamber 21 and the internal volume of the tube communicated therewith should not be greater than two times the estimated sum of the volume of the testing chamber 11 and the internal volume of the tube communicated therewith, to avoid an increase in a processing difficulty of the equipment and an increase in the cost of the equipment, caused by a design of the calibration chamber 21 being too large in calculated volume.

The gas permeation and leakage rate testing device for the non-metallic hydrogen transmission pipe provided in the present disclosure, includes the volume measuring device and the permeation and leakage rate testing unit as described in any of the above embodiments. The volume measuring device is configured to measure the calculated volume of the testing chamber 11; and the permeation and leakage rate testing unit is configured to obtain a pressure change value of the testing chamber 11 in the preset time interval, in the event where the second gas-filling assembly 8 in the volume measuring device fills the gas into the to-be-tested pipe 31 to the second set pressure and the gas permeation and leakage of the to-be-tested pipe reaches the equilibrium, the gas permeation and leakage rate of the to-be-tested pipe 31 is calculated based on the preset time interval, the pressure change value, the calculated volume of the testing chamber 11, and the current temperature in the testing chamber 11. Where the preset time interval may be any time interval after the gas permeation and leakage of the to-be-tested pipe 31 reaches the equilibrium, and may be set according to the actual measurement condition. It should be understood that when the gas permeation and leakage of the to-be-tested pipe 31 reaches the equilibrium, a slope of a curve of the pressure change in the testing chamber 11 remains unchanged, so that it is possible to determine whether the gas permeation and leakage of the to-be-tested pipe 31 reaches the equilibrium based on a change of the slope of the curve of the pressure change in the testing chamber 11. In the case where the gas permeation and leakage of the to-be-tested pipe 31 reaches the equilibrium, a time interval may be preset, and the pressure change value in the preset time interval may be recorded. Where, the calculated volume of the testing chamber 11 is measured by the volume measuring device described above, and the measurement of the calculated volume of the testing chamber 11 may be performed before the gas permeation and leakage rate test; or, after the gas permeation and leakage of the to-be-tested pipe 31 reaches the equilibrium, the gas permeation and leakage rate test may be performed, and then the calculated volume of the testing chamber 11 may be measured. The current temperature in the testing chamber 11 refers to the temperature in the testing chamber 11 after the gas permeation and leakage of the to-be-tested pipe 31 reaches the equilibrium, and may be measured at a different time from the second temperature and the third temperature are measured, and the values thereof may also be different from the second temperature and the third temperature. However, if the second temperature control assembly 14 is provided in the testing chamber 11 to keep the temperature in the testing chamber 11 constant, then the current temperature in the testing chamber 11 is the same as the second temperature and the third temperature.

When it is necessary to perform the gas permeation and leakage rate test on the to-be-tested pipe 31 or measure the calculated volume of the testing chamber 11, the two ends of the to-be-tested pipe 31 are sealed, the to-be-tested pipe 31 is placed in the testing member 1, and the testing member 1 is sealed, at which time the testing chamber 11 is formed in the testing member 1, and the gas is filled into the to-be-tested pipe 31 to the second set pressure through the second gas-filling assembly 8. After the gas permeation and leakage of the to-be-tested pipe 31 reaches the equilibrium, the pressure change value of the testing chamber 11 in the preset time interval is obtained, and then the gas permeation and leakage rate of the to-be-tested pipe 31 based on the preset time interval, the pressure change value in the preset time interval, the calculated volume of the testing chamber 11, and the current temperature in the testing chamber 11 are calculated.

Specifically, the permeation and leakage rate testing unit calculates the gas permeation and leakage rate of the to-be-tested pipe based on the following Equation 1:

$$J = \frac{\Delta P V_2}{RTL\Delta t},\qquad\text{(Equation 1)}$$

where, J represents the gas permeation and leakage rate, $\Delta P$ represents the pressure change value, $\Delta t$ represents the preset time interval, $V_2$ represents the calculated volume of the testing chamber, R represents a molar gas constant, T represents the current temperature in the testing chamber, and L represents a length of the to-be-tested pipe.

As a preferred embodiment, the gas permeation and leakage rate testing device for the non-metallic hydrogen transmission pipe further includes a gas extraction system. The gas extraction system is selectively communicated with the testing chamber 11, and the gas extraction system is selectively communicated with the to-be-tested pipe 31, and the gas extraction system is configured to discharge the gas from the testing chamber 11 and from the to-be-tested pipe 31. A gas extraction pipe is arranged between the gas extraction system and the testing member 1, a gas extraction pipe is arranged between the gas extraction system and the to-be-tested pipe 31, and each gas extraction pipe is provided with a valve. When it is necessary to extract gas from the testing member 1, open the valve between the gas extraction system and the testing member 1, and turn on a vacuum pump to vacuumize the testing member 1. When it is necessary to extract gas from the to-be-tested pipe 31, open the valve between the gas extraction system and the to-be-tested pipe 31, and turn on the vacuum pump to vacuumize the to-be-tested pipe 31.

Specifically, when performing the gas permeation and leakage rate test on the to-be-tested pipe 31, firstly, the to-be-tested pipe 31 and the testing chamber 11 are vacuumized by the gas extraction system, and it is ensured that the testing chamber 11 and the to-be-tested pipe 31 have good gas tightness; next, the second high-pressure gas supply 81 is communicated with the to-be-tested pipe 31, and the second high-pressure gas supply 81 fills the gas into the to-be-tested pipe 31 to the second set pressure; and then the gas permeation and leakage rate test of the to-be-tested pipe 31 may then be performed. It should be understood that the to-be-tested pipe 31 and the testing chamber 11 may be vacuumized simultaneously, or the to-be-tested pipe 31 and the testing chamber 11 may be vacuumized separately, and the present disclosure is not limited thereto.

In the present disclosure, the interior of the testing member 1 is the cavity, and the to-be-tested pipe 31 may be accommodated in the testing member 1. When the to-be-tested pipe 31 is placed in the testing member 1, the gas permeation and leakage of the to-be-tested pipe 31 is measured by measuring the calculated volume change and the pressure change in the testing chamber 11. It should be understood that the testing cavity 16 in the testing member 1 may accommodate any shape of the to-be-tested pipe 31, so that the testing chamber 11 formed in the testing member 1 is of any shape, and as long as the to-be-tested pipe 31 can be accommodated in the testing cavity 16 of the testing member 1, the measurement of the calculated volume of the testing chamber 11 may be performed, and thus the gas permeation and leakage rate of the to-be-tested pipe 31 may be measured. In other words, the internal space of the testing member 1 may be applied to any shape of the to-be-tested pipe 31, and when the to-be-tested pipe 31 is placed in the testing member 1, the calculated volume of the testing chamber 11 may be accurately calculated by measuring the pressure change and the temperature change in the testing chamber 11, and the gas permeation and leakage rate of the to-be-tested pipe 31 may then be measured, which improves the accuracy of the results of the gas permeation and leakage rate test of the pipe, and avoids the difficulties in measuring the volume due to the complex structures and the interstructural coordination, so that not only one set of equipment to measure non-metallic pipes with different diameter specifications and different shapes may be achieved, but also the gas permeation and leakage rate test of various types of joint-containing structures with electrofusion joints, hot-melt joints, mechanical flange joints, or the like may be achieved.

As a preferred embodiment, the gas extraction system includes a first gas extraction system selectively communicated with the testing member 1 and a second gas extraction system selectively communicated with the to-be-tested pipe 31. Where, the first gas extraction system includes a third valve 71 and a first vacuum pump 72, and the third valve 71 is disposed between the first vacuum pump 72 and the testing member 1; the second gas extraction system includes a fourth valve 73 and a second vacuum pump 74, the fourth valve 73 is disposed between the second vacuum pump 74 and the to-be-tested pipe 31, and the fourth valve 73 is disposed outside the testing member 1. Open the third valve 71, turn on the first vacuum pump 72 to vacuumize the testing member 1, and ensure good gas tightness of the testing member 1 to ensure subsequent accurate measurement data; open the fourth valve 73, turn on the second vacuum pump 74 to vacuumize the to-be-tested pipe 31, and ensure gas tightness of the to-be-tested pipe 31 to ensure subsequent accurate measurement data.

In a specific embodiment, one end of the to-be-tested pipe 31 is connected to a tube, and the tube extends from the to-be-tested pipe 31, passes through the side wall of the testing member 1, and communicates with the second high-pressure gas supply 81 and the second vacuum pump 74 by means of a three-way pipe fitting joint. A valve is provided between the three-way pipe fitting joint and the second high-pressure gas supply 81 to control a communication relationship between the second high-pressure gas supply 81 and the to-be-tested pipe 31, and the fourth valve 73 is provided between the three-way pipe fitting joint and the second vacuum pump 74 to control a communication relationship between the to-be-tested pipe 31 and the second vacuum pump 74.

As a preferred embodiment, the gas permeation and leakage rate testing device for the non-metallic hydrogen transmission pipe further includes an exhaust gas treatment system 75. The exhaust gas treatment system 75 is disposed between the first vacuum pump 72 and the second vacuum pump 74, and communicated with the first vacuum pump 72 and the second vacuum pump 74. The exhaust gas treatment system 75 is configured to recycle and reuse the gas extracted from the testing member 1 and the to-be-tested pipe 31.

In the present disclosure, after placing the to-be-tested pipe in the testing member 1, the testing member 1 is sealed, and firstly, the fourth valve 73 is opened, and the to-be-tested pipe 31 is vacuumized and depressurized by the second vacuum pump 74 of the second gas extraction system; and the third valve 71 is opened, and the testing member 1 is vacuumized and depressurized by the first vacuum pump 72 of the first gas extraction system. Then the valve between the second high-pressure gas supply 81 and the to-be-tested pipe 31 is opened, the gas is started to be filled into the to-be-tested pipe 31 by the second high-pressure gas supply 81, and the valve is closed when a pressure in the to-be-tested pipe 31 reaches the second set pressure. The gas permeation and leakage rate test is performed on the to-be-tested pipe 31. It should be understood that the vacuumizing process of the second vacuum pump 74 for the to-be-tested pipe 31 may be completed before the to-be-tested pipe 31 is placed in the testing member 1, or may be completed after the to-be-tested pipe 31 is placed in the testing member 1, as long as it is carried out before the second high-pressure gas supply 81 fills the gas into the to-be-tested pipe 31.

As a preferred embodiment, the gas permeation and leakage rate testing device for the non-metallic hydrogen transmission pipe further includes a supporting seat 32. The supporting seat 32 is movable inside the testing member 1, and the to-be-tested pipe 31 is placed on the supporting seat 32. It should be understood that the movement of the supporting seat 32 inside the testing member 1 may be achieved by provided a roller at a bottom of the supporting seat 32; or, by providing a sliding rail within the testing member 1 and providing a pulley at the bottom of the supporting seat 32, etc., so that the supporting seat 32 loaded with the to-be-tested pipe 31 is capable of stably and conveniently entering the testing member 1.

Further, the two ends of the to-be-tested pipe 31 are each provided with a sealing element 33 for sealing the to-be-tested pipe 31 to prevent the gas in the to-be-tested pipe 31 from leaking due to a poor seal. When the to-be-tested pipe 31 is located in the testing member 1, the to-be-tested pipe 31, the supporting seat 32, other components connected to the supporting seat 32, and the tube connected to the to-be-tested pipe 31 are provided in the testing member 1, and the testing chamber 11 is a cavity, which is not occupied by components accommodated inside the testing member 1, inside the testing member 1.

As a preferred embodiment, at least one side of the testing member 1 is provided with an opening for the to-be-tested pipe 31 to enter the testing member 1, and the opening is provided with a detachable end sealing element. Specifically, the testing member 1 is provided with at least one opening for loading the to-be-tested pipe 31 into the testing member 1, and after the to-be-tested pipe 31 enters the testing member 1, the opening of the testing member 1 is sealed by the end sealing element to avoid leaking of the gas in the testing member 1, which will result in inaccurate test parameters.

As a preferred embodiment, the gas permeation and leakage rate testing device for the non-metallic hydrogen transmission pipe further includes a cushion block 34. The cushion block 34 is disposed at a bottom of the testing member 1, and is configured to support the testing member 1. The cushion block 34 is configured to support the entire testing device to ensure a movement and stability of the entire testing device.

The present disclosure also provides a gas permeation and leakage rate testing method for a non-metallic hydrogen transmission pipe, using the gas permeation and leakage rate testing device for the non-metallic hydrogen transmission pipe as described in any of the above embodiments, the method includes:

Step S1: Forming the sealed testing chamber after the to-be-tested pipe is placed in the testing chamber, then vacuumizing the testing chamber; sealing the two ends of the to-be-tested pipe with the sealing elements, loading the to-be-tested pipe into the testing member through the opening of the testing member, and sealing the opening of the testing member with the end sealing element. Specifically, after the to-be-tested pipe is placed in the testing member, the testing member is sealed, all tubes are connected, a gas tightness of the entire testing device is checked, the testing chamber in the testing member is vacuumized. It is important to ensure that the entire testing device has good gas tightness, which makes the subsequent measurement data in the testing chamber accurate.

Step S2: Discharging the air from the to-be-tested pipe and then filling the gas into the to-be-tested pipe to the second set pressure. In other words, before the gas is filled into the to-be-tested pipe, discharging the air from the to-be-tested pipe, then filling the gas into the to-be-tested pipe through the second high-pressure gas supply. In another embodiment, the air in the to-be-tested pipe may not be discharged before the gas is filled into the to-be-tested pipe.

It should be understood that step S2 may be performed before step S1, whereby the method includes: sealing the two ends of the to-be-tested pipe with the sealing elements first, discharging the air from the to-be-tested pipe, then filling the gas into the to-be-tested pipe by the second high-pressure gas supply to the second set pressure, then placing the to-be-tested pipe in the testing member, and then sealing the opening of the testing member with the end sealing element, so as to form the testing chamber in the testing member. Alternatively, step S2 may be performed after step S1, whereby the method includes: sealing the two ends of the to-be-tested pipe with the sealing elements first, placing the to-be-tested pipe in the testing member, and then sealing the opening of the testing member with the end sealing element, so as to form the testing chamber in the testing member; then discharging the air from the to-be-tested pipe, and then filling the gas into the to-be-tested pipe by the second high-pressure gas supply to the second set pressure. Preferably, step S2 is performed after step S1.

Specifically, after sealing the two ends of the to-be-tested pipe 31, the second vacuum pump 74 may vacuumize the to-be-tested pipe 31 and then a gas tightness test may be conducted. After determining that the to-be-tested pipe 31 has good gas tightness, the to-be-tested pipe 31 is placed in the testing member, then the testing member is sealed, and then the gas is filled into the to-be-tested pipe 31 through the second high-pressure gas supply 81; alternatively, after vacuumizing the to-be-tested pipe 31 and determining that the to-be-tested pipe 31 has good gas tightness, the gas is filled into the to-be-tested pipe 31 through the second high-pressure gas supply 81, then the to-be-tested pipe 31 is placed in the testing member 1, and then the testing member 1 is sealed; alternatively, after sealing the two ends of the to-be-tested pipe 31, the to-be-tested pipe 31 is placed in the testing member 1, then the testing member 1 is sealed, and then the to-be-tested pipe 31 is vacuumized, and after determining that the to-be-tested pipe 31 has good gas tightness, the gas is filled into the to-be-tested pipe 31 by the second high-pressure gas supply 81.

Step S3: In the case where the gas permeation and leakage of the to-be-tested pipe 31 reaches the equilibrium, obtaining the pressure change value of the testing chamber 11 in the preset time interval, and calculating the gas permeation and leakage rate of the to-be-tested pipe 31 based on the preset time interval, the pressure change value, the calculated volume of the testing chamber 11, and the current temperature in the testing chamber 11. When a rate of a pressure change in the to-be-tested pipe 31 tends to be stable, i.e., a slope of a pressure change-time curve of the to-be-tested pipe 31 remains unchanged, the gas permeation and leakage of the to-be-tested pipe 31 reaches the equilibrium, at this time, the preset time interval is preset, and the pressure change value in the preset time interval is recorded, that is, in the preset time interval, an initial pressure of the testing chamber 11 at an initial time and a termination pressure of the testing chamber 11 at a termination time are recorded, and then a pressure difference between the initial time and the termination time of the preset time interval is calculated. Preferably, after the to-be-tested pipe 31 is placed in the test member 1 and the gas is filled into the to-be-tested pipe 31 to the second set pressure through the second high-pressure gas supply 81 and the fourth tube 82, the gas in the to-be-tested pipe 31 begins to leak, and after the gas permeation and leakage of the to-be-tested pipe 31 reaches the equilibrium, the preset time interval Δt is set, and the initial pressure of the testing chamber 11 at the initial time is recorded; and the time after Δt elapses is the termination time, the termination pressure of the testing chamber 11 at the termination time is recorded, and the pressure difference of the testing chamber 11 between the initial time and the termination time is obtained.

Then the gas permeation and leakage rate of the to-be-tested pipe is calculated based on Equation 1:

$$J = \frac{\Delta P V_2}{RTL\Delta t}, \quad \text{(Equation 1)}$$

where, J represents the gas permeation and leakage rate of the to-be-tested pipe, in mol/m/s; ΔP represents the pressure change value of the testing chamber in a time interval Δt, in Pa; Δt represents the preset time interval; $V_2$ represents the calculated volume of the testing chamber, in $m^3$; R represents the molar gas constant, which is taken to be 8.31 here, in J/mol/K; T represents the current temperature in the testing chamber, in K; and L represents the length of the to-be-tested pipe, in m.

Where, measuring the calculated volume of the testing chamber 11 by using the calibration chamber 21 may be performed before step S3 or may also be performed after step S3. Specifically, the measuring the calculated volume of the testing chamber 11 by using the calibration chamber 21 may be performed before step S3, that is, measuring the calculated volume of the testing chamber 11 by using the calibration chamber 21 may be performed after the to-be-tested pipe 31 is placed in the testing member 1 and before the second high-pressure gas supply 81 fills the gas into the to-be-tested pipe 31. Alternatively, the measuring the calculated volume of the testing chamber 11 by using the calibration chamber 21 may be performed at any time point after the second high-pressure gas supply 81 fills the gas into the to-be-tested pipe 31 and before a rate of the pressure change in the testing chamber 11 tends to be stable. Alternatively, the measuring the calculated volume of the testing chamber 11 by using the calibration chamber 21 may be performed after step S3, that is, the measuring the calculated volume of the testing chamber 11 by using the calibration chamber 21 may be performed after the gas permeation and leakage rate of the to-be-tested pipe 31 reaches the equilibrium and after the rate of the pressure change in the testing chamber 11 tends to be stable, while the to-be-tested pipe 31 is still sealed in and not taken out from the testing member 1. In other words, in the gas permeation and leakage rate testing method for the non-metallic hydrogen transmission pipe of the present disclosure, the measurement of the calculated volume of the testing chamber 11 can be performed, before or after the gas permeation and leakage test for the non-metallic hydrogen transmission pipe, by using the steps of the gas permeation and leakage rate testing method for the non-metallic hydrogen transmission pipe according to the present disclosure. It should be understood that if the calculated volume of the testing chamber 11 is measured before the gas permeation and leakage test for the non-metallic hydrogen transmission pipe, then an influence of the expansion of the to-be-tested pipe 31 on the calculated volume of the testing chamber 11 is not counted into the calculated volume of the testing chamber 11, and thus there is an error in a result of the measurement of the calculated volume of the testing chamber 11. If the calculated volume of the testing chamber 11 is measured after the gas permeation and leakage test for the non-metallic hydrogen transmission pipe, then the influence of the expansion of the to-be-tested pipe 31 on the calculated volume of the testing chamber 11 is counted into the calculated volume of the testing chamber 11, which makes data of the calculated volume of the testing chamber 11 more accurate, and makes a measurement of the gas permeation and leakage rate of the to-be-tested pipe more precise.

The present disclosure also provides a method for testing a volume expansion amount of a non-metallic pipe, using the gas permeation and leakage rate testing device for the non-metallic hydrogen transmission pipe as described in any of the above embodiments. The method includes: before performing the gas permeation and leakage rate test, the measuring unit calculates a first volume of the testing chamber based on Equation 2:

$$V_2 = \frac{P_3 - \frac{P_1}{T_1}T_3}{\frac{P_2}{T_2}T_3 - P_3} V_1, \quad \text{(Equation 2)}$$

where, $V_1$ represents the calculated volume of the calibration chamber, $V_2$ represents the calculated volume of the testing chamber, $P_1$ represents the first pressure, $P_2$ represents the second pressure, $P_3$ represents the third pressure, $T_1$ represents the first temperature, $T_2$ represents the second temperature, and $T_3$ represents the third temperature. The gas permeation and leakage rate test of the non-metallic pipe described above is performed; after the test is completed, the calculated volume of the testing chamber is calculated as a second volume based on Equation 2 by the measuring unit, and the volume expansion amount of the non-metallic pipe is obtained by calculated based on a difference between the first volume and the second volume by the measuring unit. The calculated volume of the testing chamber is measured before the permeation and leakage rate test of the to-be-tested pipe is performed, and the calculated volume of the testing chamber calculated based on Equation 2 is the first volume; the calculated volume of the testing chamber is measured after the permeation and leakage rate test of the to-be-tested pipe is performed, the second volume of the testing chamber is calculated based on Equation 2, and the difference between the first volume and the second volume is calculated to obtain a volume expansion amount of the to-be-tested pipe.

In one embodiment of the present disclosure, the to-be-tested pipe 31 is placed in the testing member 1 through the opening of the testing member 1, then the testing member 1 is sealed, and the testing chamber 11 is formed in the interior of the testing member 1. The second valve 223 between the calibration chamber 21 and the first high-pressure gas supply 222 is opened to communicate the first high-pressure gas supply 222 with the calibration chamber 21, the gas is filled into the calibration chamber 21 to the first set pressure, then the second valve 223 is closed, the first pressure $P_1$ and the first temperature $T_1$ in the calibration chamber 21 are read, and the second pressure $P_2$ and the second temperature $T_2$ in the testing chamber 11 are read. Then, the first valve 6 between the testing chamber 11 and the calibration chamber 21 is opened to communicate the calibration chamber 21 with the testing chamber 11 so as to mix the gas in the calibration chamber 21 and the gas in the testing chamber 11, and after the pressure and the temperature in the testing chamber 11 are stable, the third pressure $P_3$ and the third temperature $T_3$ in the testing chamber 11 are recorded at this time, and then the first volume of the testing chamber 11 is obtained according to Equation 2.

Next, the first valve 6 between the calibration chamber 21 and the testing chamber 11 is closed, the testing chamber 11 is vacuumized by the first vacuum pump 72, and the to-be-tested pipe 31 is vacuumized by the second vacuum pump 74. Then the second gas-filling assembly 8 is communicated with the to-be-tested pipe 31, the gas is filled into the to-be-tested pipe 31 to the second set pressure by the second high-pressure gas supply 81, and the permeation and leakage test of the to-be-tested pipe 31 is started. After hydrogen permeation and leakage of the to-be-tested pipe 31 reaches equilibrium, the pressure change value in the testing chamber during the preset time interval and the current temperature in the testing chamber are recorded, and thus the permeation and leakage rate of the to-be-tested pipe 31 is obtained.

After the permeation and leakage rate test of the to-be-tested pipe 31 is completed, the measuring unit 9 measures the second volume of the testing chamber 11 according to the above volume measuring method, and the difference between the first volume and the second volume is calculated to obtain the volume expansion amount of the to-be-tested pipe 31.

In another embodiment of the present disclosure, the to-be-tested pipe 31 is placed in the testing member 1 through the opening of the testing member 1, then the testing member 1 is sealed, and the testing chamber 11 is formed between an inner wall of the testing member 1 and the to-be-tested pipe 31. The testing chamber 11 is vacuumized by the first vacuum pump 72, and the to-be-tested pipe 31 is vacuumized by the second vacuum pump 74. Then the second gas-filling assembly 8 is communicated with the to-be-tested pipe 31, the gas is filled into the to-be-tested pipe 31 to the second set pressure, and the permeation and leakage test of the to-be-tested pipe 31 is started. After the gas permeation and leakage of the to-be-tested pipe 31 reaches the equilibrium, the pressure change value in the testing chamber in the preset time interval and the current temperature in the testing chamber 11 are recorded.

Next, the second valve 223 between the calibration chamber 21 and the first high-pressure gas supply 222 is opened to communicate the first high-pressure gas supply 222 with the calibration chamber 21, the gas is filled into the calibration chamber 21 to the first set pressure, the second valve 223 is closed, the first pressure $P_1$ and the first temperature $T_1$ in the calibration chamber 21 are read, and the second pressure $P_2$ and the second temperature $T_2$ in the testing chamber 11 are read. Then the first valve 6 between the testing chamber 11 and the calibration chamber 21 is opened to communicate the calibration chamber 21 with the testing chamber 11 so as to mix the gas in the calibration chamber 21 and the gas in the testing chamber 11, and after the pressure and the temperature in the testing chamber 11 are stable, the third pressure $P_3$ and the third temperature $T_3$ in the testing chamber 11 are recorded at this time, the first valve 6 between the calibration chamber 21 and the testing chamber 11 is closed, then the calculated volume of the testing chamber 11 is calculated according to an above-mentioned calculated volume calculation formula of the testing chamber 11, i.e., Equation 2, and then the gas permeation and leakage rate of the to-be-tested pipe 31 is obtained based on the calculated volume of the testing chamber 11, and the pressure change value and the temperature in the preset time interval after the gas permeation and leakage of the to-be-tested pipe 31 reaches the equilibrium as described above.

In the gas permeation and leakage rate testing method for the non-metallic hydrogen transmission pipe of the present disclosure, the first volume of the testing chamber 11 may be obtained by measuring the calculated volume of the testing chamber 11 before the gas permeation and leakage test of the to-be-tested pipe 31 is performed, the second volume of the testing chamber 11 may be obtained by measuring the calculated volume of the testing chamber 11 after the gas permeation and leakage test of the to-be-tested pipe 31 is performed, and a change in volume expansion of the to-be-tested pipe 31 is obtained based on the difference between the first volume and the second volume, that is, a difference of the calculated volumes of the testing chamber 11 before and after the gas permeation and leakage test of the to-be-tested pipe 31, so as to obtain the volume expansion amount of the to-be-tested pipe 31 caused by internal pressurization of the to-be-tested pipe 31. A problem that it is difficult to perform testing due to a too small volume of the testing chamber 11 and difficult installment of a displacement sensor in a vacuum environment is solved. Besides, the measurement of the calculated volume of the testing chamber 11 may be performed when the gas permeation and leakage rate test is completed, without a need to take the to-be-tested pipe 31 out of the testing member 1. In addition, in this embodiment, the expansion and deformation of the to-be-tested pipe 31 is counted into the calculated volume of the testing chamber 11, and a result of the test is more accurate.

The gas permeation and leakage rate test for the non-metallic hydrogen transmission pipe is taken as an example in the present disclosure to illustrate specific implementations in actual application scenarios.

Example 1

As an example, the to-be-tested pipe 31 was a polyethylene pipe with an outer diameter of 110 mm, a wall thickness of 10 mm, and a length of 1,000 mm, and a permeation and leakage test of helium was performed on the to-be-tested pipe 31; where the calculated volume of the calibration chamber 21, which was the sum of the volume of the calibration chamber and the internal volume of the tube communicated therewith, was 0.02 m³, i.e., 20 L.

Before performing the test, the second valve 223 was opened to pressurize the calibration chamber 21 so that the pressure in the calibration chamber 21 reached 0.21 MPa, and data of the temperature in the calibration chamber 21 was read as 30° C., i.e., 303.15 K, by the first temperature sensor 212 provided on the calibration chamber 21. Thereafter, the second valve 223 was closed, and a reading of the pressure of the second pressure sensor 12 of the testing chamber 11 was read as 0.1 MPa and a reading of the temperature of the second temperature sensor 13 was read as 22° C., i.e., 295.15 K.

The first valve 6 connected to the calibration chamber 21 and the testing chamber 11 was opened to mix the gas in the calibration chamber 21 with the gas in the testing chamber 11, and after a period of time, it was observed that the reading of the second pressure sensor 12 for the testing chamber 11 was stable and was 0.11 MPa, and the reading of the second temperature sensor 13 was stable and was 23° C., i.e., 296.15 K.

Based on the above data, the calculated volume of the testing chamber 11 before the test is performed was calculated, based on Equation 2, as 0.197 m³, i.e., 197 L:

$$V_2 = \frac{P_3 - \frac{P_1}{T_1}T_3}{\frac{P_2}{T_2}T_3 - P_3} V_1. \quad \text{(Equation 2)}$$

The first valve 6 connected to the calibration chamber 21 and the testing chamber 11 was closed, the testing chamber 11 was vacuumized to 10 Pa by the first vacuum pump 72, 1 MPa of high-pressure pure helium was filled into the to-be-tested pipe 31, and the permeation and leakage test was started.

After the test was completed, repeat the above steps performed before the test, including pressurizing the calibration chamber 21, reading, and communicating the calibration chamber 21 with the testing chamber 11 to mix the gases therein. Before mixing the gases in the calibration chamber 21 and the testing chamber 11, a reading of the pressure of the first pressure sensor 211 located on the calibration chamber 21 was 0.195 MPa, a reading of the temperature of the first temperature sensor 212 located on the calibration chamber 21 was 30° C., the reading of the pressure of the second pressure sensor 12 for the testing chamber 11 was 2200 Pa, and the reading of the temperature of the second temperature sensor 13 for the testing chamber 11 was 23° C. After mixing the gases in the calibration chamber 21 and the testing chamber 11, the reading of the pressure of the second pressure sensor 12 for the testing chamber 11 was 19,865 Pa, and the reading of the temperature of the second temperature sensor 13 of the testing chamber 11 was 24° C.

Based on the above data, similarly, the calculated volume of the testing chamber 11 after the test was completed was calculated to be 0.194 m³, i.e., 194 L.

Therefore, a pressure generated by a helium permeation and leakage could be corrected based on the above data, and at the same time, the volume expansion amount of the to-be-tested pipe 31 was calculated as 0.003 m³, i.e., 3 L.

Example 2

As an example, the to-be-tested pipe 31 was the polyethylene pipe with the outer diameter of 110 mm, the wall thickness of 10 mm, and the length of 1,000 mm, and a permeation and leakage test of hydrogen was performed on the to-be-tested pipe 31; where the calculated volume of the calibration chamber 21, which was the sum of the volume of the calibration chamber and the internal volume of the tube communicated therewith, was 0.02 m³, i.e., 20 L.

Before performing the test, the second valve was opened to pressurize the calibration chamber 21 so that the pressure in the calibration chamber 21 reached 0.21 MPa, and the data of the temperature in the calibration chamber 21 was read as 30° C., i.e., 303.15 K, by the first temperature sensor 212 provided on the calibration chamber 21. Thereafter, the second valve was closed, and the reading of the pressure of the second pressure sensor 12 of the testing chamber 11 was read as 0.1 MPa and the reading of the temperature of the second temperature sensor 13 was read as 22° C., i.e. 295.15K.

The first valve 6 connected to the calibration chamber 21 and the testing chamber 11 was opened to mix the gas in the calibration chamber 21 with the gas in the testing chamber 11, and after a period of time, it was observed that the reading of the second pressure sensor 12 for the testing chamber 11 was stable and was 0.11 M Pa, and the reading of the second temperature sensor 13 was stable and was 23° C., i.e., 296.15 K.

Based on the above data, the calculated volume of the testing chamber 11 before the test is performed was calculated, based on Equation 2, as 0.197 m³, i.e., 197 L, $$V_2 = \frac{P_3 - \frac{P_1}{T_1}T_3}{\frac{P_2}{T_2}T_3 - P_3} V_1. \quad \text{(Equation 2)}$$

The first valve 6 connected to the calibration chamber 21 and the testing chamber 11 was closed, the testing chamber 11 was vacuumized to 10 Pa by the first vacuum pump 72, 1 MPa of high-pressure pure hydrogen was filled into the to-be-tested pipe 31, and the permeation and leakage test was started.

After the test is completed, repeat the above steps performed before the test, including pressurizing the calibration chamber 21, reading, and communicating the calibration chamber 21 with the testing chamber 11 to mix the gases therein. Before mixing the gases in the calibration chamber 21 and the testing chamber 11, the reading of the pressure of the first pressure sensor 211 located on the calibration chamber 21 was 0.195 MPa, the reading of the temperature of the first temperature sensor 212 located on the calibration chamber 21 was 30° C., the reading of the pressure of the second pressure sensor 12 for the testing chamber 11 was 2,000 Pa, and the reading of the temperature of the second temperature sensor 13 for the testing chamber 11 was 23° C. After mixing the gases in the calibration chamber 21 and the testing chamber 11, the reading of the pressure of the second pressure sensor 12 for the testing chamber 11 was 19,680 Pa, and the reading of the temperature of the second temperature sensor 13 for the testing chamber 11 was 24° C.

Based on the above data, similarly, the calculated volume of the testing chamber 11 after the test is completed was calculated to be 0.194 m³, i.e., 194 L.

Therefore, a pressure generated by the hydrogen permeation and leakage could be corrected based on the above data, and at the same time, the volume expansion amount of the to-be-tested pipe 31 was calculated as 0.003 m³, i.e., 3 L.

Example 3

As an example, the to-be-tested pipe 31 was the polyethylene pipe with the outer diameter of 110 mm, the wall thickness of 10 mm, and the length of 1,000 mm, and the permeation and leakage test of hydrogen was performed on the to-be-tested pipe 31. In a case where the calibration chamber 21 was not used to calibrate the calculated volume of the testing chamber 11, the calculated volume of the testing chamber 11 obtained by calculating based on geometric dimensions of structures of the testing member 1, the to-be-tested pipe 31, and the end sealing element of the to-be-tested pipe was 183 L. After the hydrogen permeation and leakage of the non-metallic pipe reaches the equilibrium, the reading of the pressure of the second pressure sensor 12 for the testing chamber 11 was increased from 1,200 Pa to 2,000 Pa in a time interval of 1 hour, and the reading of the temperature of the second temperature sensor 13 was 23° C. At this time, a hydrogen permeation and leakage rate of the non-metallic pipe obtained through calculating was $1.65 \times 10^{-5}$ mol/m/s.

The calculated volume of the calibration chamber 21 of the present disclosure was the sum of the volume of the calibration chamber 21 and the internal volume of the tube communicated therewith, and was 0.02 m³, i.e., 20 L. After a hydrogen permeation and leakage rate test of the non-metallic pipe was completed, calibrating the calculated volume of the testing chamber 11 by the calibration chamber 21. The reading of the pressure of the first pressure sensor 211 located on the calibration chamber 21 was 0.195 MPa, the reading of the temperature of the first temperature sensor 212 located on the calibration chamber 21 was 30° C., the reading of the pressure of the second pressure sensor 12 for the testing chamber 11 was 2,000 Pa, and the reading of the temperature of the second temperature sensor 13 for the testing chamber 11 was 23° C. After the calibration chamber 21 is communicated with the testing chamber 11, the reading of the pressure of the second pressure sensor 12 for the testing chamber 11 was 19,680 Pa and the reading of the temperature of the second temperature sensor 13 for the testing chamber 11 was 24° C. The calculated volume of the testing chamber 11 after the test was thus calculated to be 0.194 m³, i.e., 194 L. At this time, the hydrogen permeation and leakage rate of the non-metallic pipe obtained through calculating was $1.75 \times 10^{-5}$ mol/m/s.

It could be seen that without the volume measuring device and method according to the present disclosure, a result of the hydrogen permeation and leakage rate test for the non-metallic pipe would have an error of 5.7% (($1.75 \times 10^{-5} - 1.65 \times 10^{-5}$)/$1.75 \times 10^{-5}$=5.7%).

Example 4

As an example, the to-be-tested pipe 31 was the polyethylene pipe with the outer diameter of 110 mm, the wall thickness of 10 mm, and the length of 1,000 mm, and the permeation and leakage test of hydrogen was performed on the to-be-tested pipe 31. The calculated volume of the testing chamber 11 was calibrated using the calibration chamber 21, and the calculated volume of the calibration chamber 21 was the sum of the volume of the calibration chamber 21 and the internal volume of the tube communicated therewith, and was 0.02 m³, i.e., 20 L. According to Example 1, the calculated volume of the testing chamber measured before the permeation and leakage test of hydrogen of the to-be-tested pipe 31 was 197 L. If the calculated volume of the testing chamber 11 before the permeation and leakage test of hydrogen of the to-be-tested pipe 31 were used for a calculation of the hydrogen permeation and leakage rate of the pipe (i.e., expansion and deformation of the non-metallic pipe in the testing process was not considered), the hydrogen permeation and leakage rate of the non-metallic pipe obtained through calculating would be $1.78 \times 10^{-5}$ mol/m/s.

By using the volume measuring device and method described in the present disclosure, the calculated volume of the testing chamber was measured again after the permeation and leakage test of hydrogen of the to-be-tested pipe (i.e., the expansion and deformation of the non-metallic pipe in the testing process was considered), then the calculated volume of the testing chamber after the permeation and leakage test of hydrogen was 194 L, and at this time, the hydrogen permeation and leakage rate of the non-metallic pipe obtained through calculating was $1.75 \times 10^{-5}$ mol/m/s.

It could be seen that, if the expansion and deformation of the non-metallic pipe in the testing process were not considered, the result of the hydrogen permeation and leakage rate test for the non-metallic pipe would have an error of 1.7% (($1.78 \times 10^{-5} - 1.75 \times 10^{-5}$)/$1.75 \times 10^{-5}$=1.7°).

Example 5

As an example, the to-be-tested pipe 31 was the polyethylene pipe with the outer diameter of 110 mm, the wall thickness of 10 mm, and the length of 1,000 mm, and the permeation and leakage test of hydrogen was performed on the to-be-tested pipe 31; the first temperature control assembly 23 and the second temperature control assembly 14 were added in the calibration chamber 21 and in the testing chamber 11, respectively, so that the constant temperature environment was maintained throughout the testing process. The calculated volume of the calibration chamber 21 was the sum of the volume of the calibration chamber 21 and the internal volume of the tube communicated therewith, and was 0.02 m³, i.e., 20 L.

The second valve 223 was opened to pressurize the calibration chamber 21 so that the pressure in the calibration chamber 21 reached 0.21 MPa, thereafter, the second valve 223 was closed and the reading of the pressure of the second pressure sensor 12 for the testing chamber 11 was read as 0.1 MPa; the first valve 6 connected to the calibration chamber 21 and the testing chamber 11 was opened to mix the gas in the calibration chamber 21 with the gas in the testing chamber 11, and after a period of time, it was observed that the reading of the pressure of the second pressure sensor 12 for the testing chamber 11 was stable and was 0.11 MPa.

Based on the above data, according to Equation 3:

$$V_2 = \frac{P_3 - P_1}{P_2 - P_3} V_1. \quad \text{(Equation 3)}$$

The calculated volume of the testing chamber 11 was calculated as 0.20 m³, i.e., 200 L.

Example 6

As an example, the to-be-tested pipe 31 was the polyethylene pipe with the outer diameter of 110 mm, the wall thickness of 10 mm, and the length of 1,000 mm, and repeated measurements of the calculated volume of the testing chamber 11 could be performed. The calculated volume of the calibration chamber 21 was the sum of the volume of the calibration chamber 21 and the internal volume of the tube communicated therewith, and was 0.02 m³, i.e., 20 L.

As an example, in a constant temperature testing environment, the second valve 223 was opened to pressurize the calibration chamber 21 so that the pressure in the calibration chamber 21 reached 0.32 MPa; thereafter, the second valve 223 was closed, and the reading of the pressure of the second pressure sensor 12 for the testing chamber 11 was read as 0.1 MPa; the first valve 6 connected to the calibration chamber 21 and the testing chamber 11 was opened to mix the gas in the calibration chamber 21 with the gas in the testing chamber 11, and after a period of time, it was observed that the reading of the pressure of the second pressure sensor 12 for the testing chamber 11 was stable and was 0.12 MPa. The calculated volume of the testing chamber 11 was calculated as 0.20 m³, i.e., 200 L.

Repeat the above steps, the pressure in the calibration chamber 21 was set as 0.64 MPa, and the reading of the pressure of the testing chamber 11 was 0.1 MPa, and the reading of the pressure of the second pressure sensor 12 for the testing chamber 11 after mixing the gas in the calibration chamber 21 and the gas in the testing chamber 11 was 0.15 MPa, and the calculated volume of the testing chamber 11 was calculated as 0.196 m³, i.e., 196 L.

The calculated volumes of the testing chamber of the above two measurements are averaged, so that the calculated volume of the testing chamber could be obtained as 0.198 m³, i.e., 198 L. Of course, it is also possible to repeat the above steps more times to obtain a more accurate value of the calculated volume of the testing chamber 11.

The objectives, technical solutions, and beneficial effects of the present disclosure are further described in detail through the specific embodiments above, and it should be understood that the foregoing descriptions are merely specific embodiments of the present disclosure and are not intended to limit the protection scope of the present disclosure. It is particularly pointed out that any modifications, equivalent replacements, improvements and the like made within the spirit and principle of the present disclosure by those skilled in the art shall fall within the protection scope of the present disclosure.

The invention claimed is:

1. A gas permeation and leakage rate testing device for a non-metallic hydrogen transmission pipe, comprising:
   a testing member, the testing member being formed with a testing cavity adapted to placing a to-be-tested pipe, wherein the testing cavity is formed with a sealed testing chamber after the to-be-tested pipe is placed in the testing cavity;
   a calibration chamber, the calibration chamber being selectively communicated with the testing chamber;
   a first gas-filling assembly, the first gas-filling assembly being selectively communicated with the calibration chamber to be adapted to filling a gas into the calibration chamber to a first set pressure;
   a second gas-filling assembly, the second gas-filling assembly being selectively communicated with the to-be-tested pipe to be adapted to filling the gas into the to-be-tested pipe to a second set pressure;
   a measuring unit, the measuring unit being configured to measure a pressure and a temperature in the calibration chamber and a pressure and a temperature in the testing chamber, and to calculate a calculated volume of the testing chamber based on a first pressure and a first temperature in the calibration chamber and a second pressure and a second temperature in the testing chamber before the calibration chamber is communicated with the testing chamber, and a third pressure and a third temperature in the testing chamber after the calibration chamber is communicated with the testing chamber and after permeation and leakage of the to-be-tested pipe reaches equilibrium; and
   a permeation and leakage rate testing unit, the permeation and leakage rate testing unit being configured to obtain a pressure change value of the testing chamber in a preset time interval, and to calculate a gas permeation and leakage rate of the to-be-tested pipe based on the preset time interval, the pressure change value, a current temperature in the testing chamber, and the calculated volume of the testing chamber after the permeation and leakage of the to-be-tested pipe reaches the equilibrium;
   wherein the measuring unit calculates the calculated volume of the testing chamber based on Equation 2:

$$V_2 = \frac{P_3 - \frac{P_1}{T_1} T_3}{\frac{P_2}{T_2} T_3 - P_3} V_1, \quad \text{(Equation 2)}$$

wherein $V_1$ represents a calculated volume of the calibration chamber, $V_2$ represents the calculated volume of the testing chamber, $P_1$ represents the first pressure, $P_2$ represents the second pressure, $P_3$ represents the third pressure, $T_1$ represents the first temperature, $T_2$ represents the second temperature, and $T_3$ represents the third temperature.

2. The gas permeation and leakage rate testing device according to claim 1, wherein the permeation and leakage rate testing unit calculates the gas permeation and leakage rate of the to-be-tested pipe based on Equation 1:

$$J = \frac{\Delta P V_2}{RTL\Delta t}, \quad \text{(Equation 1)}$$

wherein J represents the gas permeation and leakage rate, $\Delta P$ represents the pressure change value, $\Delta t$ represents the preset time interval, $V_2$ represents the calculated volume of the testing chamber, R represents a molar gas constant, T represents the current temperature in the testing chamber, and L represents a length of the to-be-tested pipe.

3. The gas permeation and leakage rate testing device according to claim 1, wherein the measuring unit comprises:
a first temperature sensor and a first pressure sensor provided corresponding to the calibration chamber; and
a second temperature sensor and a second pressure sensor provided corresponding to the testing chamber.

4. The gas permeation and leakage rate testing device according to claim 1, wherein the measuring unit further comprises:
a first temperature control assembly provided corresponding to the calibration chamber, and a second temperature control assembly provided corresponding to the testing chamber, wherein the first temperature control assembly and the second temperature control assembly are configured to adjust the second temperature to be the same as the first temperature.

5. The gas permeation and leakage rate testing device according to claim 2, wherein the measuring unit further comprises:
a first temperature control assembly provided corresponding to the calibration chamber, and a second temperature control assembly provided corresponding to the testing chamber, and the first temperature control assembly and the second temperature control assembly being configured to adjust the second temperature to be the same as the first temperature.

6. The gas permeation and leakage rate testing device according to claim 3, wherein the measuring unit further comprises:
a first temperature control assembly provided corresponding to the calibration chamber, and a second temperature control assembly provided corresponding to the testing chamber, and the first temperature control assembly and the second temperature control assembly being configured to adjust the second temperature to be the same as the first temperature.

7. The gas permeation and leakage rate testing device according to claim 4, wherein in a case where the first temperature is the same as the second temperature, the measuring unit calculates the calculated volume of the testing chamber based on Equation 3:

$$V_2 = \frac{P_3 - P_1}{P_2 - P_3} V_1, \qquad \text{(Equation 3)}$$

wherein $V_1$ represents the calculated volume of the calibration chamber, $V_2$ represents the calculated volume of the testing chamber, $P_1$ represents the first pressure, $P_2$ represents the second pressure, and $P_3$ represents the third pressure.

8. The gas permeation and leakage rate testing device according to claim 5, wherein in a case where the first temperature is the same as the second temperature, the measuring unit calculates the calculated volume of the testing chamber based on Equation 3:

$$V_2 = \frac{P_3 - P_1}{P_2 - P_3} V_1, \qquad \text{(Equation 3)}$$

wherein $V_1$ represents the calculated volume of the calibration chamber, $V_2$ represents the calculated volume of the testing chamber, $P_1$ represents the first pressure, $P_2$ represents the second pressure, and $P_3$ represents the third pressure.

9. The gas permeation and leakage rate testing device according to claim 6, wherein in a case where the first temperature is the same as the second temperature, the measuring unit calculates the calculated volume of the testing chamber based on Equation 3:

$$V_2 = \frac{P_3 - P_1}{P_2 - P_3} V_1, \qquad \text{(Equation 3)}$$

wherein $V_1$ represents the calculated volume of the calibration chamber, $V_2$ represents the calculated volume of the testing chamber, $P_1$ represents the first pressure, $P_2$ represents the second pressure, and $P_3$ represents the third pressure.

10. The gas permeation and leakage rate testing device according to claim 1, wherein a sum of a volume of the calibration chamber and an internal volume of a tube communicated with the calibration chamber is greater than or equal to $1/10$ of a sum of a volume of the testing chamber and an internal volume of a tube communicated with the testing chamber, and the sum of the volume of the calibration chamber and the internal volume of the tube communicated with the calibration chamber is less than or equal to two times the sum of the volume of the testing chamber and the internal volume of the tube communicated with the testing chamber.

11. The gas permeation and leakage rate testing device according to claim 2, wherein a sum of a volume of the calibration chamber and an internal volume of a tube communicated with the calibration chamber is greater than or equal to $1/10$ of a sum of a volume of the testing chamber and an internal volume of a tube communicated with the testing chamber, and the sum of the volume of the calibration chamber and the internal volume of the tube communicated with the calibration chamber is less than or equal to two times the sum of the volume of the testing chamber and the internal volume of the tube communicated with the testing chamber.

12. The gas permeation and leakage rate testing device according to claim 3, wherein a sum of a volume of the calibration chamber and an internal volume of a tube communicated with the calibration chamber is greater than or equal to $1/10$ of a sum of a volume of the testing chamber and an internal volume of a tube communicated with the testing chamber, and the sum of the volume of the calibration chamber and the internal volume of the tube communicated with the calibration chamber is less than or equal to two times the sum of the volume of the testing chamber and the internal volume of the tube communicated with the testing chamber.

13. The gas permeation and leakage rate testing device according to claim 1, wherein the to-be-tested pipe comprises a non-metallic pipe and a connecting joint connected to the non-metallic pipe, and the connecting joint is any one of a hot-melt joint, an electrofusion joint, and a mechanical joint.

14. The gas permeation and leakage rate testing device according to claim 2, wherein the to-be-tested pipe comprises a non-metallic pipe and a connecting joint connected to the non-metallic pipe, and the connecting joint is any one of a hot-melt joint, an electrofusion joint, and a mechanical joint.

15. The gas permeation and leakage rate testing device according to claim 3, wherein the to-be-tested pipe comprises a non-metallic pipe and a connecting joint connected to the non-metallic pipe, and the connecting joint is any one of a hot-melt joint, an electrofusion joint, and a mechanical joint.

16. The gas permeation and leakage rate testing device according to claim 1, wherein the gas comprises at least one of hydrogen, helium, natural gas, nitrogen, methane, mashgas, and carbon dioxide.

17. A gas permeation and leakage rate testing method for a non-metallic hydrogen transmission pipe, wherein the gas permeation and leakage rate testing device according to claim 1 is used, and the gas permeation and leakage rate testing method for the non-metallic hydrogen transmission pipe comprises:

after the to-be-tested pipe is placed in the testing cavity and then the testing cavity is formed with the sealed testing chamber, vacuumizing the testing chamber;

discharging air from the to-be-tested pipe and filling the gas into the to-be-tested pipe to the second set pressure;

obtaining the pressure change value of the testing chamber in the preset time interval when gas permeation and leakage in the to-be-tested pipe reaches equilibrium, and calculating the gas permeation and leakage rate of the to-be-tested pipe based on the preset time interval, the pressure change value, the calculated volume of the testing chamber, and the current temperature in the testing chamber.

18. A gas permeation and leakage rate testing method for a non-metallic hydrogen transmission pipe, wherein the gas permeation and leakage rate testing device according to claim 2 is used, and the gas permeation and leakage rate testing method for the non-metallic hydrogen transmission pipe comprises:

after the to-be-tested pipe is placed in the testing cavity and then the testing cavity is formed with the sealed testing chamber, vacuumizing the testing chamber;

discharging air from the to-be-tested pipe and filling the gas into the to-be-tested pipe to the second set pressure;

obtaining the pressure change value of the testing chamber in the preset time interval when gas permeation and leakage in the to-be-tested pipe reaches equilibrium, and calculating the gas permeation and leakage rate of the to-be-tested pipe based on the preset time interval, the pressure change value, the calculated volume of the testing chamber, and the current temperature in the testing chamber.

19. A method for testing a volume expansion amount of a non-metallic hydrogen transmission pipe, wherein a gas permeation and leakage rate testing device for the non-metallic hydrogen transmission pipe is used, the device comprises:

a testing member, the testing member being formed with a testing cavity adapted to placing a to-be-tested pipe, wherein the testing cavity is formed with a sealed testing chamber after the to-be-tested pipe is placed in the testing cavity;

a calibration chamber, the calibration chamber being selectively communicated with the testing chamber;

a first gas-filling assembly, the first gas-filling assembly being selectively communicated with the calibration chamber to be adapted to filling a gas into the calibration chamber to a first set pressure;

a second gas-filling assembly, the second gas-filling assembly being selectively communicated with the to-be-tested pipe to be adapted to filling the gas into the to-be-tested pipe to a second set pressure;

a measuring unit, the measuring unit being configured to measure a pressure and a temperature in the calibration chamber and a pressure and a temperature in the testing chamber, and to calculate a calculated volume of the testing chamber based on a first pressure and a first temperature in the calibration chamber and a second pressure and a second temperature in the testing chamber before the calibration chamber is communicated with the testing chamber, and a third pressure and a third temperature in the testing chamber after the calibration chamber is communicated with the testing chamber and after permeation and leakage of the to-be-tested pipe reaches equilibrium; and a permeation and leakage rate testing unit, the permeation and leakage rate testing unit being configured to obtain a pressure change value of the testing chamber in a preset time interval, and to calculate a gas permeation and leakage rate of the to-be-tested pipe based on the preset time interval, the pressure change value, a current temperature in the testing chamber, and the calculated volume of the testing chamber after the permeation and leakage of the to-be-tested pipe reaches the equilibrium; and the method for testing the volume expansion amount of the non-metallic hydrogen transmission pipe comprises:

calculating a first volume of the testing chamber by the measuring unit, before performing a gas permeation and leakage rate test, based on Equation 2:

$$V_2 = \frac{P_3 - \frac{P_1}{T_1}T_3}{\frac{P_2}{T_2}T_3 - P_3}V_1, \quad \text{(Equation 2)}$$

wherein $V_1$ represents the calculated volume of the calibration chamber, $V_2$ represents the calculated volume of the testing chamber, $P_1$ represents the first pressure, $P_2$ represents the second pressure, $P_3$ represents the third pressure, $T_1$ represents the first temperature, $T_2$ represents the second temperature, and $T_3$ represents the third temperature;

performing the gas permeation and leakage rate test for the non-metallic hydrogen transmission pipe according to the gas permeation and leakage rate testing method for the non-metallic hydrogen transmission pipe of claim 17; and calculating a second volume of the testing chamber by the measuring unit based on Equation 2 after the gas permeation and leakage rate test is completed, and calculating a volume expansion amount of the to-be-tested pipe by the measuring unit based on a difference between the first volume and the second volume.

20. A method for testing a volume expansion amount of a non-metallic hydrogen transmission pipe, wherein a gas permeation and leakage rate testing device for the non-metallic hydrogen transmission pipe is used, the device comprises:

a testing member, the testing member being formed with a testing cavity adapted to placing a to-be-tested pipe, wherein the testing cavity is formed with a sealed testing chamber after the to-be-tested pipe is placed in the testing cavity;

a calibration chamber, the calibration chamber being selectively communicated with the testing chamber;

a first gas-filling assembly, the first gas-filling assembly being selectively communicated with the calibration chamber to be adapted to filling a gas into the calibration chamber to a first set pressure;

a second gas-filling assembly, the second gas-filling assembly being selectively communicated with the to-be-tested pipe to be adapted to filling the gas into the to-be-tested pipe to a second set pressure;

a measuring unit, the measuring unit being configured to measure a pressure and a temperature in the calibration chamber and a pressure and a temperature in the testing chamber, and to calculate a calculated volume of the testing chamber based on a first pressure and a first temperature in the calibration chamber and a second pressure and a second temperature in the testing chamber before the calibration chamber is communicated with the testing chamber, and a third pressure and a third temperature in the testing chamber after the calibration chamber is communicated with the testing chamber and after permeation and leakage of the to-be-tested pipe reaches equilibrium; and a permeation and leakage rate testing unit, the permeation and leakage rate testing unit being configured to obtain a pressure change value of the testing chamber in a preset time interval, and to calculate a gas permeation and leakage rate of the to-be-tested pipe based on the preset time interval, the pressure change value, a current temperature in the testing chamber, and the calculated volume of the testing chamber after the permeation and leakage of the to-be-tested pipe reaches the equilibrium;

wherein the permeation and leakage rate testing unit calculates the gas permeation and leakage rate of the to-be-tested pipe based on Equation 1:

$$J = \frac{\Delta P V_2}{RTL\Delta t},\qquad \text{(Equation 1)}$$

wherein J represents the gas permeation and leakage rate, $\Delta P$ represents the pressure change value, $\Delta t$ represents the preset time interval, $V_2$ represents the calculated volume of the testing chamber, R represents a molar gas constant, T represents the current temperature in the testing chamber, and L represents a length of the to-be-tested pipe;

and the method for testing the volume expansion amount of the non-metallic hydrogen transmission pipe comprises:

calculating a first volume of the testing chamber by the measuring unit, before performing a gas permeation and leakage rate test, based on Equation 2:

$$V_2 = \frac{P_3 - \frac{P_1}{T_1}T_3}{\frac{P_2}{T_2}T_3 - P_3} V_1, \qquad \text{(Equation 2)}$$

wherein $V_1$ represents the calculated volume of the calibration chamber, $V_2$ represents the calculated volume of the testing chamber, $P_1$ represents the first pressure, $P_2$ represents the second pressure, $P_3$ represents the third pressure, $T_1$ represents the first temperature, $T_2$ represents the second temperature, and $T_3$ represents the third temperature;

performing the gas permeation and leakage rate testing method for the non-metallic hydrogen transmission pipe according to claim 18; and calculating a second volume of the testing chamber by the measuring unit based on Equation 2 after the gas permeation and leakage rate testing method is completed, and calculating a volume expansion amount of the to-be-tested pipe by the measuring unit based on a difference between the first volume and the second volume.

* * * * *